(12) United States Patent
Nakamura et al.

(10) Patent No.: US 8,113,924 B2
(45) Date of Patent: Feb. 14, 2012

(54) APPARATUS FOR TRANSFERRING A STICK WITH A STRAND OF SAUSAGE OR THE LIKE SUSPENDED THEREFROM

(75) Inventors: Tatsuo Nakamura, Kanagawa (JP); Katsuya Tanabe, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 12/869,009

(22) Filed: Aug. 26, 2010

(65) Prior Publication Data
US 2011/0053481 A1    Mar. 3, 2011

(30) Foreign Application Priority Data

Aug. 27, 2009 (JP) .................................. 2009-196783

(51) Int. Cl.
*A22C 11/00* (2006.01)
(52) U.S. Cl. ........................................................ 452/32
(58) Field of Classification Search .............. 452/30–32, 452/35–37, 46–48, 51, 182, 183, 187; 198/419.3, 198/676.1, 678.1
See application file for complete search history.

(56) References Cited

U.S. PATENT DOCUMENTS

| | | | | |
|---|---|---|---|---|
| 6,257,974 | B1 * | 7/2001 | Basile, II | 452/51 |
| 6,592,452 | B1 * | 7/2003 | Myers | 452/51 |
| 7,160,184 | B1 * | 1/2007 | Lebsack et al. | 452/177 |
| 7,249,997 | B2 * | 7/2007 | Kasai | 452/51 |
| 7,255,638 | B2 * | 8/2007 | Stimpfl | 452/32 |
| 7,347,772 | B2 * | 3/2008 | Lebsack et al. | 452/177 |
| 7,354,338 | B2 | 4/2008 | Nakamura et al. | |
| 7,588,485 | B1 * | 9/2009 | Nakamura et al. | 452/51 |
| 7,735,630 | B2 * | 6/2010 | Borkiewicz et al. | 198/465.4 |

FOREIGN PATENT DOCUMENTS

| | | |
|---|---|---|
| JP | 06-021351 | 6/1994 |
| JP | 08-266216 | 10/1996 |
| JP | 2005-304435 | 11/2005 |

OTHER PUBLICATIONS

NOK Iron Rubber Belt, Cat. No. 183, pp. 56-57, NOK Corporation, Oct. 2002, Tokyo, Japan.
IKO Linear Motion Rolling Guides, Linear Roller Way Super X, Cat-5507.1, pp. C2-C3, Mar. 2009, Japan.
IKO Linear Roller Way Super X Series, The Roller Effect Monster, pp. 3-4, Nov. 2005, Japan.
IKO Linear Roller Way Super X Series, The Roller Effect Monster, pp. 3-4, Nov. 2006, Japan.

* cited by examiner

*Primary Examiner* — Richard Price, Jr.
(74) *Attorney, Agent, or Firm* — Bachman & LaPointe, P.C.

(57) ABSTRACT

An apparatus for transferring a stick with a strand of sausage or the like suspended therefrom includes a transversely transferring device for transferring a stick from a first position to a second position by stick transverse transfer members; and a vertically transferring device having stick vertical transfer members which receive the stick from the stick transverse transfer members at the second position and deliver the stick to a conveyor device. The transversely transferring device has a stick transfer body having the stick transverse transfer members provided thereon, a rail body for supporting the stick transfer body and guiding its linear movement, and a transverse wrapping connector traveling body wound around and trained between transverse transfer wheels. A stick transfer body is adapted to be reciprocatingly moved by a transverse transfer electric motor.

8 Claims, 12 Drawing Sheets

FIG. 5
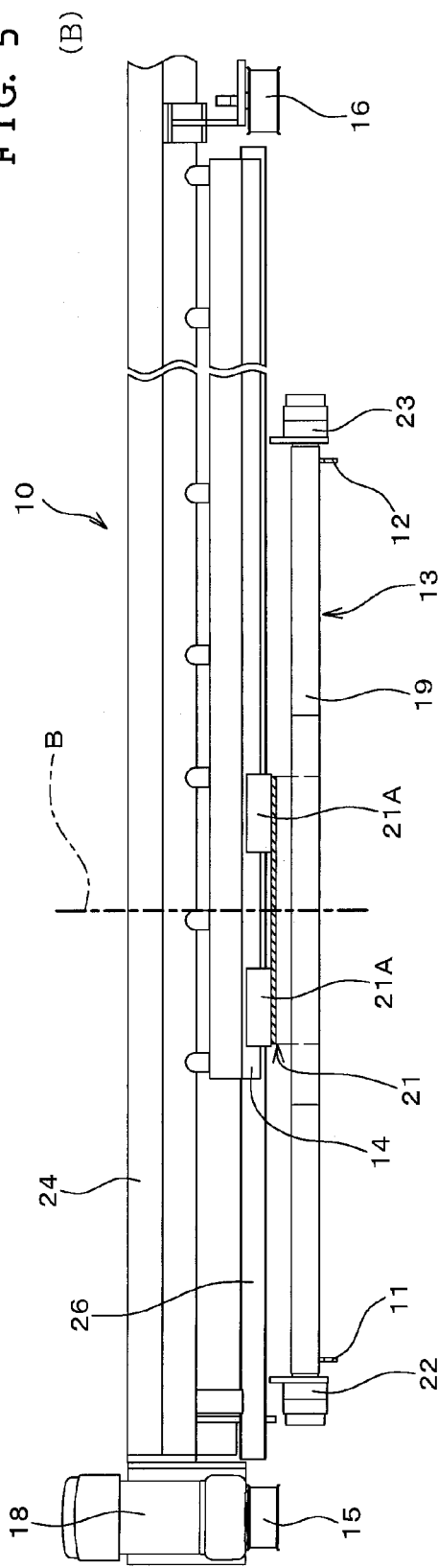
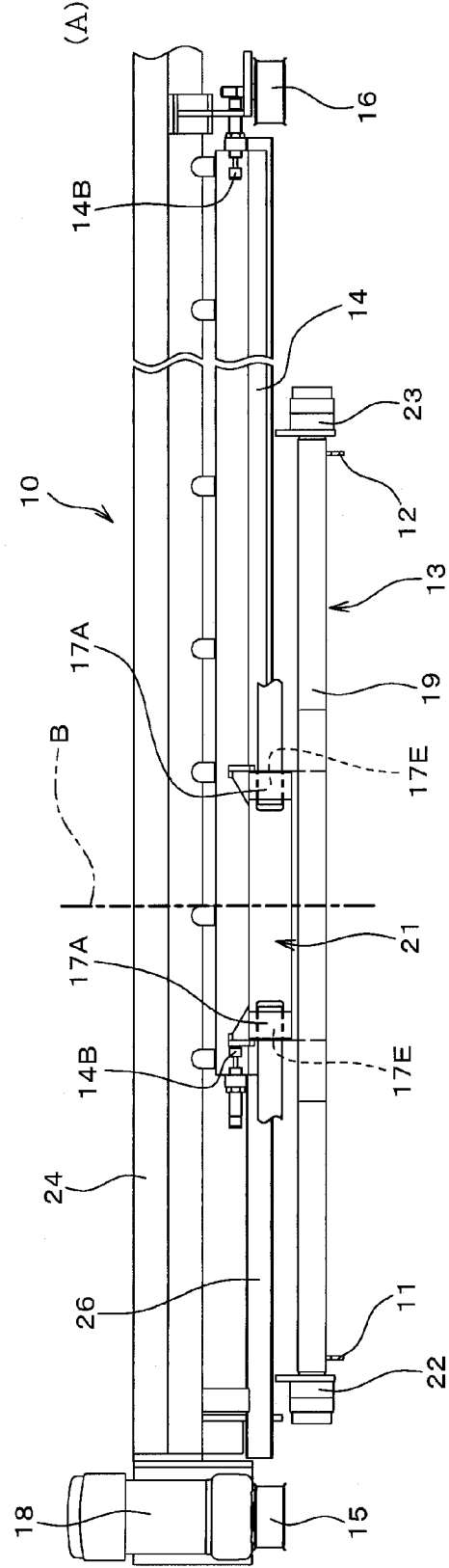

FIG. 8
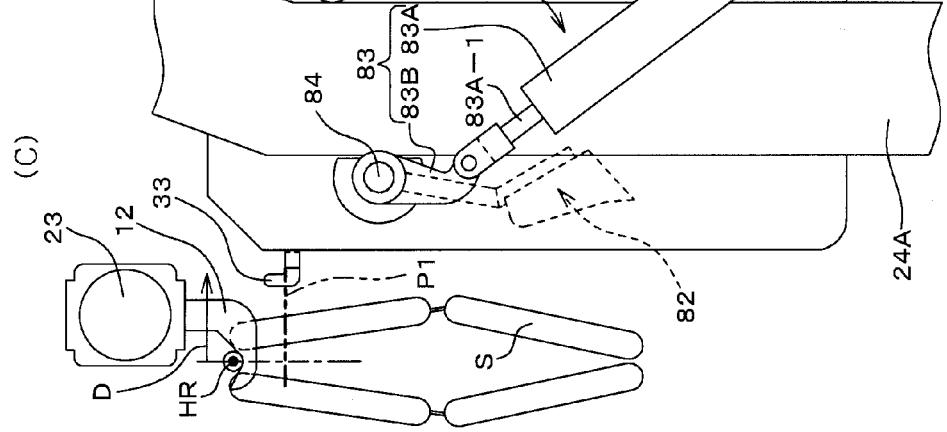
(A)
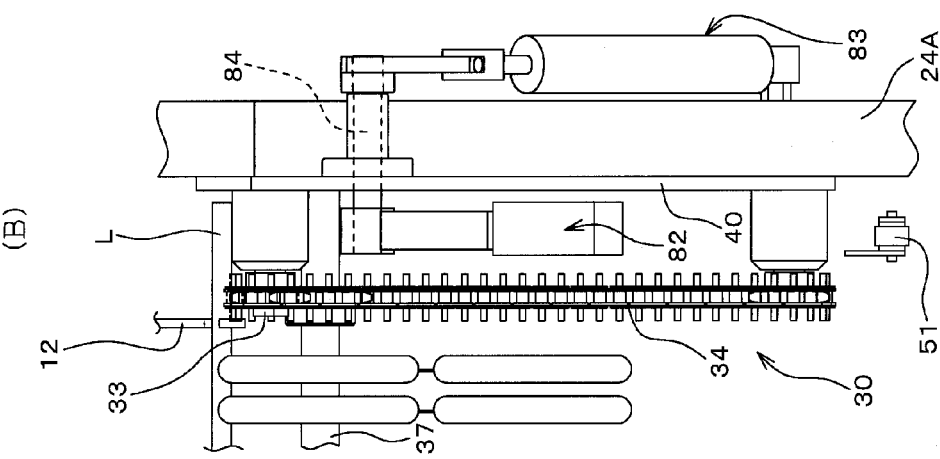
(B)
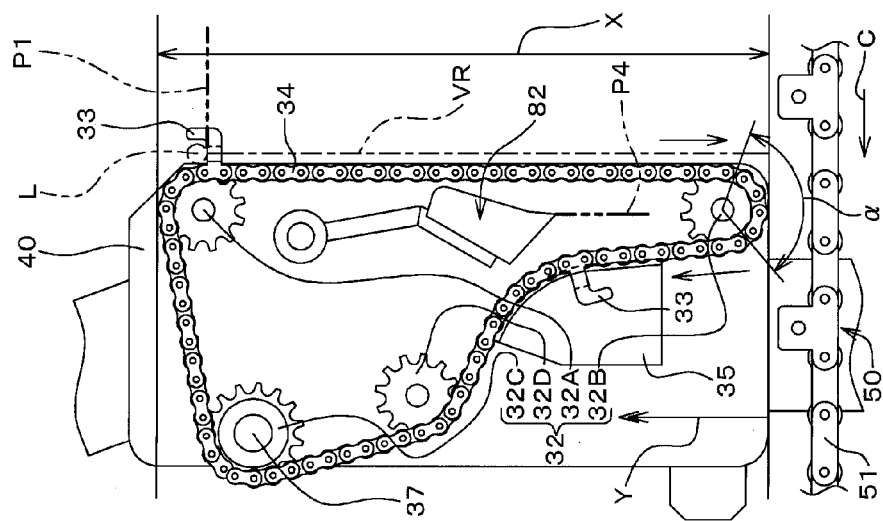
(C)

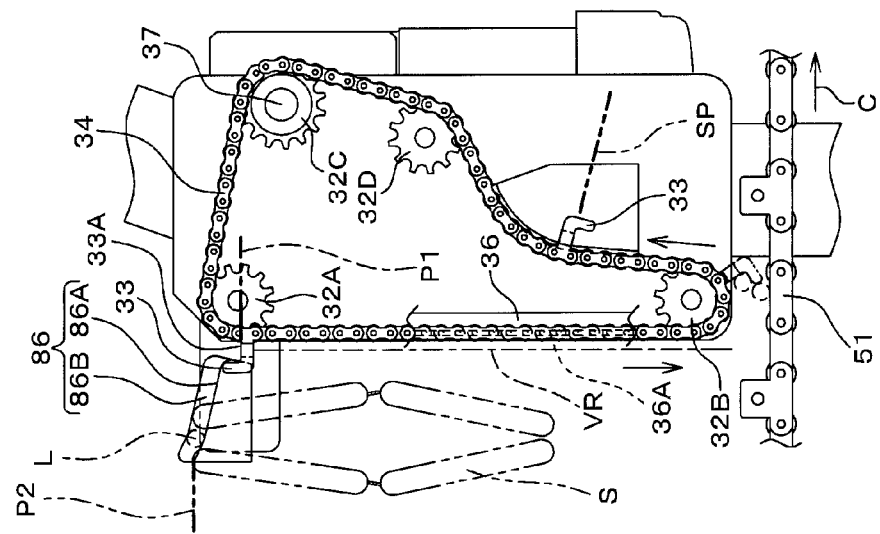
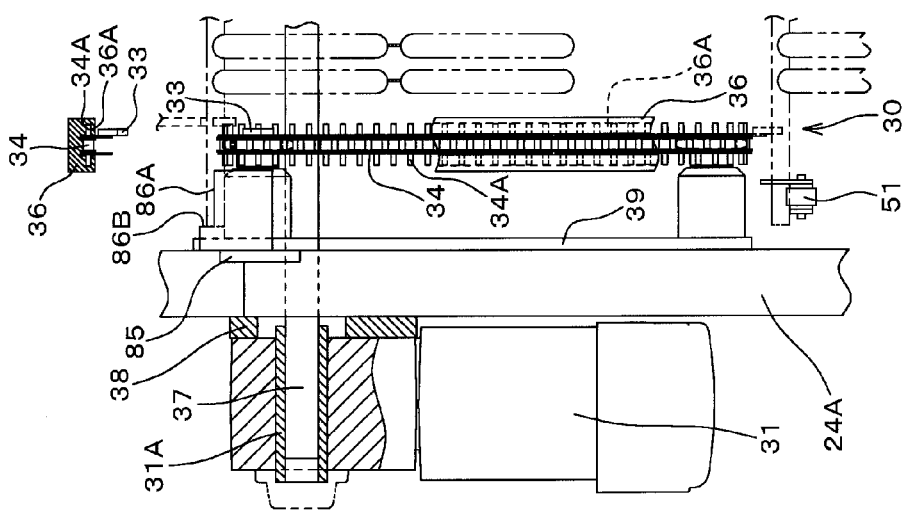
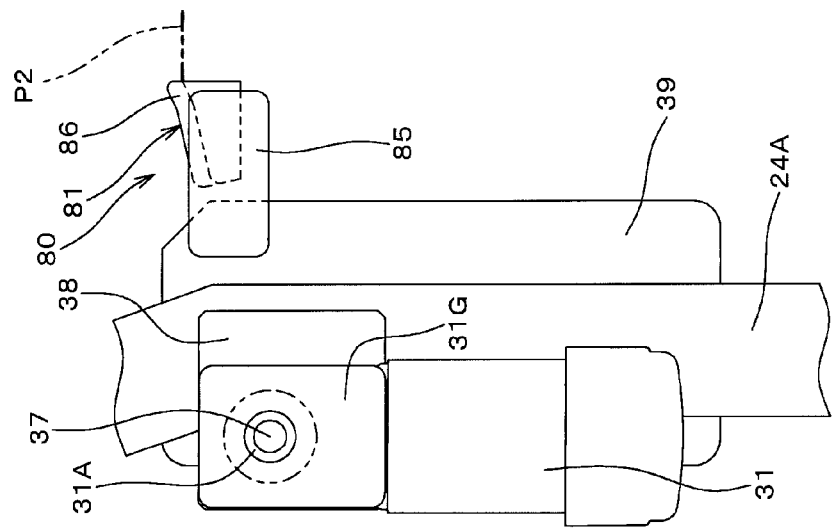
FIG. 10

FIG. 11
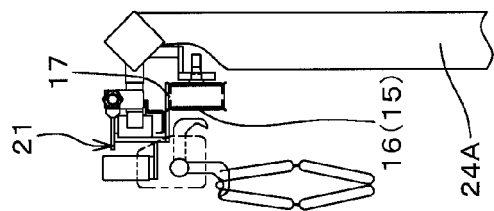
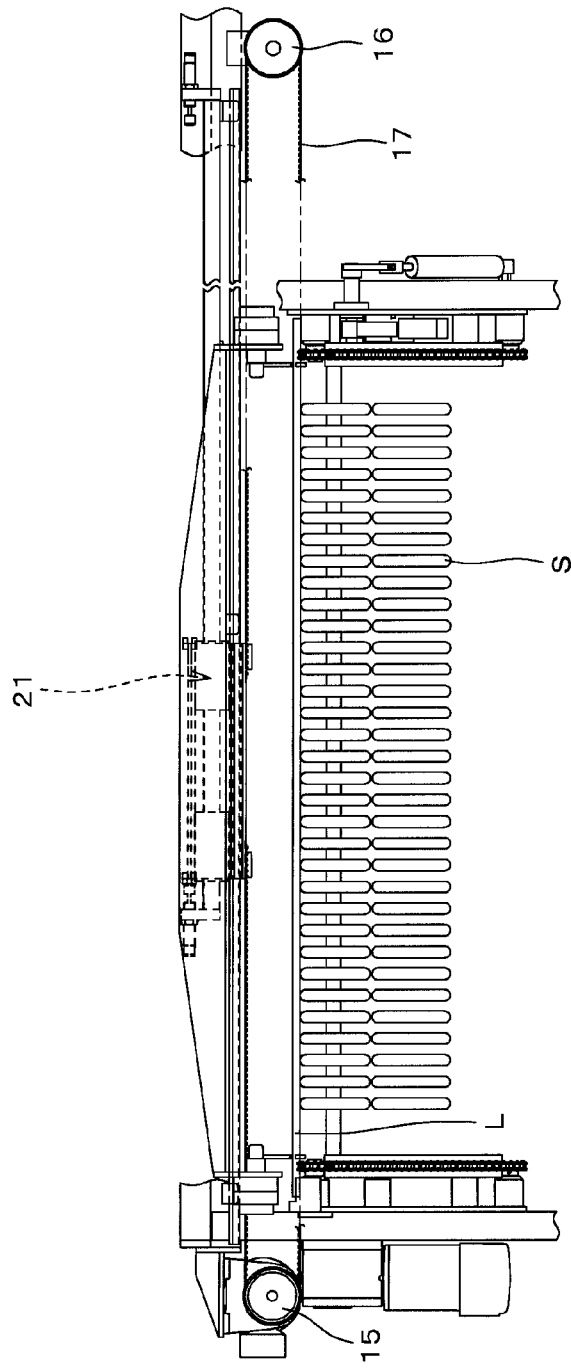

APPARATUS FOR TRANSFERRING A STICK WITH A STRAND OF SAUSAGE OR THE LIKE SUSPENDED THEREFROM

BACKGROUND OF THE INVENTION

1. Field of the Invention

The present invention relates to an apparatus for transferring a stick with a strand of sausage or the like suspended therefrom whereby sticks each having a strand of sausage or the like suspended therefrom are transferred to a conveyor means which conveys the sticks to a heat treatment facility including a smoking truck for the purpose of heat treatment of the sausage or the like.

2. Description of the Related Art

As apparatuses of this type, apparatuses disclosed in JP-A-2005-304435, JP-UM-B-6-21351, and JP-A-8-266216 are known. The apparatus of JP-A-2005-304435 has a transferring means 9 wherein a stick 4 with a strand of sausage wound therearound and suspended therefrom in the form of loops is lifted up by hooks 35 from stick receivers 25 of a stick relaying and supporting means 8 which supports the stick 4 at its both ends, and this stick 4 is transferred to a forward position in the longitudinal direction of the stick 4, and wherein the transferring means 9 at the forward position of transfer lowers and delivers the stick 4 by a lowering means to a conveying means 10 which travels in an orthogonal direction to this transferring direction.

The aforementioned transferring means 9 includes a horizontal rod 47 extending in the longitudinal direction of the stick 4 and having the hooks 35 at its both ends, and this horizontal rod 47 is supported at its longitudinally central portion by a body 51B of a rodless cylinder 51. The horizontal rod 47 is adapted to reciprocate in a direction X, i.e., the longitudinal direction of the horizontal rod 47, by the actuation of the rodless cylinder 51.

The delivery of the stick 4 from the aforementioned transferring means 9 to the conveying means 10 is effected by rotating a pair of lifting rotational arms 55 by a pneumatic rotary actuator 56 (FIGS. 5A and 5B), or by attaching the horizontal rod 47 to a body 59B of a vertical rodless cylinder 59 mounted on the body 51B and by lowering the horizontal rod 47 by the vertical rodless cylinder (FIG. 6).

JP-UM-B-6-21351 discloses a lowering means 5 which is lowered and transfers to a conveyor a hanging rod 2 (corresponding to the stick of JP-A-2005-304435) with sausage loops suspended therefrom, upon receiving the hanging rod 2 which has been sent thereto by a relaying and conveying means 3 for supporting the hanging rod 2 at its both ends and conveying it in the longitudinal direction of the hanging rod 2. The lowering means 5 has a pair of placing bases 10 for receiving the hanging rod 2 and a pair of vertical transfer members for respectively lowering the placing bases 10. The vertical transfer members are constituted by two cylinder units fixed vertically, and two air cylinders are disposed outside the passage of the hanging rod 2 so that a rod of each of the cylinder units as a member for upwardly pushing the placing base 10 does not cause a hindrance to the transfer of the hanging rod 2 which is conveyed by a conveyor 4.

JP-A-8-266216 discloses a conveying apparatus 51 for conveying an elongated rod 2 (corresponding to the stick of JP-A-2005-304435) in a conveying direction A which is the longitudinal direction of the elongated rod 2 (FIGS. 9 to 13). As shown in FIG. 12, the conveying apparatus 51 includes an endless chain 56; a driving-side sprocket wheel 61 and a driven-side sprocket wheel 62 (FIG. 9); an electric motor (not shown) for circulatingly moving the endless chain 56 along the conveying direction A; and a supporting means 54 (FIG. 9) which is attached to the endless chain 56 to horizontally support the elongated rod 2. Supporting members 67 and 68 of the supporting means 54 are respectively mounted to preceding and following support blocks 65 which are attached to the endless chain 56 (FIG. 9). The support blocks 65 move in the conveying direction A while being positioned and guided by guide rail members 69 (see FIG. 12 as well).

In JP-A-8-266216, a receiving means 250 is provided for receiving the elongated rods 2 conveyed by the above-described conveying apparatus 51 (FIGS. 15 and 16). This receiving means 250 has two endless chains 255 which are each wound around and trained between a driving sprocket wheel 253 and a driven sprocket wheel 254 and travel in the vertical direction; a pair of receiving plates 256 attached to the endless chains 255; and a driving mechanism (not shown) for rotating the pair of driving sprocket wheels 253. As for the pair of receiving plates 256, their relative positions with respect to the aforementioned supporting members 67 and 68 are predetermined owing to the traveling of the endless chains 255 so that the pair of receiving plates 256 receive at their end portions the elongated rod 2 which came slipping down from the supporting members 67 and 68 of the conveying apparatus 51. Upon receiving the elongated rod 2, the receiving plates 256 transfer the elongated rod 2 to a pair of endless chains 261 of another conveying apparatus 251 as the endless chains 255 travel.

However, in JP-A-2005-304435, the horizontal rod 47 is mounted on the body 51B of a rodless cylinder 51, so that the total weight of the long stick 4 with a strand of sausage 2 suspended therefrom and the long horizontal rod 47 is adapted to be applied to the short body 51B. Therefore, the sliding resistance applied to the body 51B which reciprocatingly moves horizontally is likely to vary with the movement of the horizontal rod 47, and in the light of characteristics of the pneumatic rodless cylinder in which variations are likely to occur in the moving speed based on load variations, with the apparatus of JP-A-2005-304435, the moving speed of the rodless cylinder must be set slow to prevent the deviation of the stick 4 on the hooks 35 due to the swaying of the sausage 2 which is ascribable to the variation of the moving speed of the horizontal rod 47. As a result, the productivity of the apparatus declines.

Further, in the case of the construction in which the rodless cylinder 59 which is operated in the vertical direction is mounted on the body 51B, the weight of the rodless cylinder 59 is applied to the body 51B, and the load increases by that portion. Therefore, the moving speed of the rodless cylinder which is reciprocatingly moved must be set even slower, with the result that the productivity declines further.

Furthermore, in the case where the lowering means uses the lifting rotational arms 55, the strand of sausage 2 suspended from the stick 4 supported by the lifting rotational arms 55 is lowered while being moved in an opposite direction to a conveying direction Y of the conveying means 10, so that an extra vacant space over a pair of endless chains 62 of the aforementioned conveying means 10 for placing the stick 4 thereon is required by the portion of the movement in the aforementioned opposite direction. In consequence, not only does the stick loading efficiency of the conveying means 10 aggravate, but opportunities of delivery of sticks to the conveying means decrease, so that the productivity of the apparatus declines.

In JP-UM-B-6-21351, the above-described drawback due to the rotation of the lowering means as in JP-A-2005-304435 does not occur, but since the two cylinder units (lowering means 5) fixed vertically have their positions fixed below the conveyor 4, there is a possibility that the hanging rod 2 and the strand of sausage which are transferred from the upstream side on that conveyor 4 may come into contact with the cylinders. Further, there is another possibility that the lowering movement of the two cylinders may fall out of synchronization, possibly rendering instable the delivery of the hanging rod 2 to the conveyor 4.

With the apparatus disclosed in JP-A-8-266216, the horizontal transfer and vertical transfer of the stick with the strand of sausage suspended therefrom are effected by electric motors and chains. However, although the apparatus of this JP-A-8-266216 does not have the above-described drawback ascribable to being a pneumatic cylinder, in the horizontal transfer of the stick, the line of movement of the endless chain 56 and the extending direction of a fitting groove 84 of the guide rail member 69 in which the supporting member is fitted and slides therein are parallel, but are offset from each other with an interval therebetween in the horizontal direction (FIG. 13). Therefore, the sliding resistance which occurs during the transfer is large, and smooth transfer is difficult, so that this apparatus is unsuitable for high-speed transfer. In addition, since the preceding support block 65 and the following support block 65 are separately attached to different chain links of the endless chain 56, the above-described drawback is promoted. In this respect as well, this apparatus is unsuitable for high-speed transfer.

In the receiving means 250 for vertical transfer in JP-A-8-266216 (FIGS. 15 and 16), the receiving means 250 is at positions opposing a frame 60 of the conveying apparatus 51 in a perpendicular direction (direction of arrow B) to the aforementioned conveying direction A. The aforementioned positions where the receiving means 250 is disposed are both side positions where the supporting members 67 and 68 sandwich the pair of receiving plates 256 in the conveying direction A of the conveying apparatus 51. Therefore, the size of the apparatus in the perpendicular direction (direction of arrow B) to the aforementioned conveying direction A becomes large. Furthermore, since the pair of receiving plates 256 is long (length for supporting three sticks), this apparatus is not suitable for high-speed lowering.

SUMMARY OF THE INVENTION

In view of the above-described circumstances, it is an object of the present invention to provide an apparatus for transferring a stick with a strand of sausage or the like suspended therefrom, which is capable of improving the productivity of the apparatus by rendering high-speed the transfer speed of the stick with the strand of sausage or the like suspended therefrom, and which has a structure capable of making the apparatus compact.

An apparatus for transferring a stick with a strand of sausage or the like suspended therefrom in accordance with the present invention comprises: transversely transferring means having a front-back pair, in a transfer direction of the stick, of stick transverse transfer members which are reciprocatingly movable between a first position and a second position which is located forwardly of the first position and is on a side of a transferring direction of the stick with the strand of sausage or the like suspended therefrom, the transversely transferring means being adapted to transfer the stick in a longitudinal direction of the stick from the first position to the second position by the stick transverse transfer members respectively supporting both end portions of the stick placed on the stick transverse transfer members at the first position; and vertically transferring means having a stick vertical transfer member which receives the stick released from the support by the stick transverse transfer members and disengaged from the stick transverse transfer members at the second position, undergoes lowering movement, and delivers the stick to conveyor means which travels in a direction intersecting the transfer direction of the stick.

In the above-described apparatus for transferring a stick with a strand of sausage or the like suspended therefrom, the above object of the invention can be attained by either a first aspect of the invention or a second aspect of the invention which are described below.

In the first aspect of the invention, the transversely transferring means includes a stick transfer body having the front-back pair of stick transverse transfer members respectively provided at both end portions thereof, a rail body which supports the stick transfer body and guides linear movement thereof between the first position and the second position, and a transverse wrapping connector traveling body wound around and trained between transverse transfer wheels respectively provided in vicinities of both end sides of the rail body, the stick transfer body being secured to a part of the transverse wrapping connector traveling body and adapted to be reciprocatingly moved by the forward and reverse rotation of the transverse transfer wheel which is driven by a transverse transfer electric motor.

It should be noted that, in the present invention, the phrase "supporting both end portions of the stick placed on the stick transverse transfer members" at the first position means that the stick placed manually on the stick transverse transfer members at the first position by an operator is supported by stick transverse transfer members, that the stick is placed on and supported by stick transverse transfer members as the stick transverse transfer members at the first position take up the stick from stick standby supporting means provided separately at the first position, that the stick is placed on and supported by stick transverse transfer members as the stick transverse transfer members at the first position receive the stick disengaged from the stick standby supporting means upon release of the support at the first position by the stick standby supporting means, or cases similar to these cases. It should be noted that the phase "take up the stick from stick standby supporting means" is construed to include the taking up of the stick by scooping up the stick from below, nipping the stick from left and right, nipping the stick from above and below, or other actions similar to these.

In the first aspect of the invention having the above-described construction, the total weight of the stick with the strand of sausage or the like suspended therefrom and the stick transfer body is received by the rail body, and the stick transfer body supported by the rail body is reciprocatingly moved by the transverse wrapping connector traveling body which is driven by the transverse transfer electric motor. Therefore, the magnitude of resistance occurring between the rail body and the stick transfer body and the range of variation of resistance during transfer decrease, thereby permitting high-speed movement of the stick transfer body. Furthermore, since the vertically transferring means does not reciprocatingly move together with the stick transfer body, the load on the stick transfer body is small, this construction is suitable for high-speed movement of the stick transfer body, and the apparatus becomes compact.

The stick transverse transfer members at the second position need not wait for the start of lowering movement of the stick vertical transfer member toward the conveyor means, and is able to start retreating movement toward the first position immediately after the stick is disengaged from the stick transverse transfer members, so that the stick transverse transfer cycle time is short. Additionally, since the stick transfer body is reciprocatingly movable at high speed, the productivity of the apparatus is high.

In the second aspect of the invention, the vertically transferring means includes a vertical wrapping connector traveling body which is wound around and trained between vertical transfer wheels rotatively driven by a vertical transfer electric motor to form a lowering zone for downwardly moving the stick, and to which the stick vertical transfer member is attached, and stick sliding means which, when the stick vertical member is at a standstill at an upper position in the lowering zone, guides toward the stick vertical transfer member the sliding of the stick disengaged from the stick transverse transfer members, the stick vertical transfer member being adapted to receive the stick from the stick sliding means.

In the second aspect of the invention having the above-described construction, since the stick which is disengaged from the stick transverse transfer members is received by the stick vertical transfer member via the stick sliding means, even if the length of the stick transverse transfer member is short, the sausage or the like during the transverse transfer of the stick does not come into contact with the stick vertical transfer member. Furthermore, since the stick sliding member reliably guides to the stick vertical transfer member the sliding of the stick disengaged from the stick transverse transfer members, even if the length of the stick vertical transfer member is short, the stick vertical transfer member is able to reliably receive the stick which fell down from the sliding means, and place the stick thereon.

Because the lengths of the stick transverse transfer member and the stick vertical transfer member are short, the apparatus becomes compact, the load applied to the transverse wrapping connector traveling body which is driven by the vertical transfer electric motor is reduced, and the high-speed traveling of the vertical wrapping connector traveling body becomes possible. Since the movement of the stick vertical transfer member is at high speed, and the absence time of the stick vertical transfer member at the upper position (standby position) is short, the productivity of the apparatus is high.

Since the stick vertical transfer member having a short length, after undergoing lowering movement in a substantially vertical direction, rotatively moves and places the stick onto the conveyor means, it is possible to place the sticks in a narrow space on the conveyor, so that the loading efficiency of the conveyor becomes high.

Furthermore, since the vertical wrapping connector traveling body is disposed upwardly of the conveyor means, the drawback of the vertical wrapping connector traveling body coming into contact with the stick conveyed by the conveyor means does not occur.

According to the invention, it is possible to provide an apparatus for transferring a stick with a strand of sausage or the like suspended therefrom, which is capable of improving the productivity of the apparatus by rendering high-speed the transfer speed of the stick with the strand of sausage or the like suspended therefrom, and which has a compact structure, as described above.

BRIEF DESCRIPTION OF THE DRAWINGS

FIGS. 5A and 5B are plan views in accordance with this embodiment in the state of FIG. 2, in which FIG. 5A is a fragmentary diagram of a transverse wrapping connector traveling body, and FIG. 5B is a diagram illustrating the transverse wrapping connector traveling body and a moving body with their upper portions omitted;

FIGS. 8A to 8C illustrate a rear vertical wrapping connector traveling body and its vicinities of a vertically transferring means of the apparatus shown in FIG. 1, in which FIG. 8A is a side elevational view taken from the front side, FIG. 8B is a front elevational view, and FIG. 8C is a side elevational view taken from the rear side, illustrating that a stick sliding member is at a retreated position;

FIG. 9A to 9C illustrate the rear vertical wrapping connector traveling body and its vicinities of the vertically transferring means of the apparatus shown in FIG. 1, in which FIG. 9A is a side elevational view taken from the front side, FIG. 9B is a front elevational view, and FIG. 9C is a side elevational view taken from the rear side, illustrating that the stick sliding member is at a stick sliding guiding position;

FIGS. 10A to 10C illustrate a front vertical wrapping connector traveling body and its vicinities of the vertically transferring means of the apparatus shown in FIG. 1, in which FIG. 10A is a side elevational view taken from the front side, FIG. 110B is a front elevational view, and FIG. 10C is a side elevational view taken from the rear side;

FIGS. 11A and 11B illustrate the apparatus in accordance with a second embodiment of the invention, in which FIG. 11A is a front elevational view and FIG. 11B is a side elevational view taken from the rear side.

DESCRIPTION OF THE PREFERRED EMBODIMENTS

Figure 1:
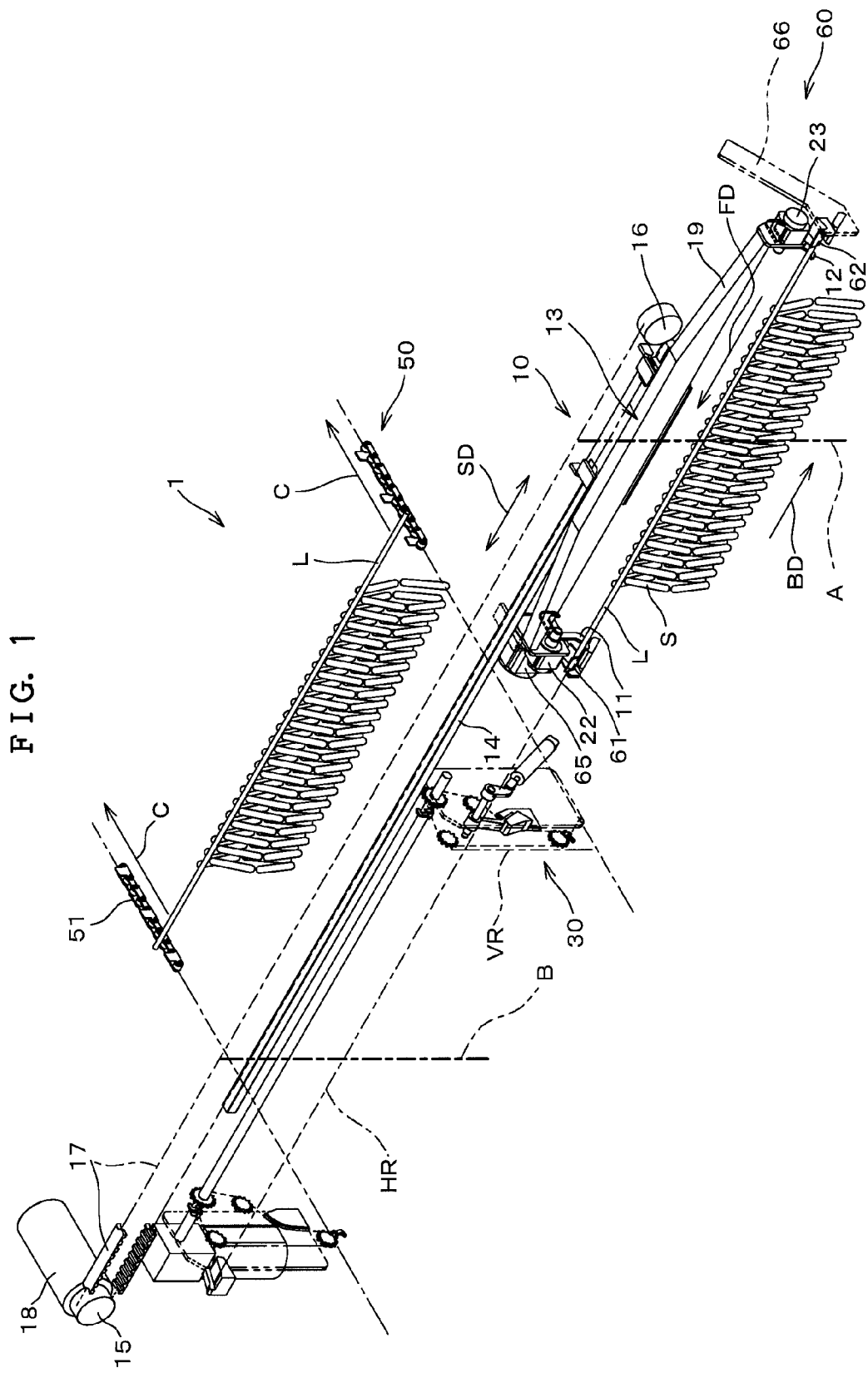
FIG. 1 is a perspective view illustrating a schematic construction of essential portions of the apparatus in accordance with a first embodiment of the invention, and illustrates a state in which a stick transfer body of a transversely transferring means is located at a first position.

Hereafter, a detailed description will be given of the present invention on the basis of the embodiments with reference to the accompanying drawings. It should be noted that the present invention is not limited to the illustrated embodiments.

First, with reference to FIGS. 1 to 10C, a description will be given of a transfer apparatus for transferring a stick with a strand of sausage or the like suspended therefrom in accordance with a first embodiment of the invention. It should be noted that, in FIGS. 1 and 2, to clarify the positions and directions, the side of a first position A and a direction toward that side will be respectively referred to as a "backward side" and a "backward direction;" the side of a second position B and a direction toward that side will be respectively referred to as a "front side" and a "forward direction;" the longitudinal direction of a stick in a substantially horizontal plane supported by a transversely transferring means will be referred to as a "transverse direction;" an up-down direction perpendicular to the transverse direction, i.e., a substantially vertical direction, will be referred to as a "vertical direction;" a left-right direction perpendicular to both the vertical direction and the transverse direction will be referred to as a "lateral direction;" a rightward direction of that direction will be referred to as a "rightward lateral direction;" and a leftward direction of that direction will be referred to as a "leftward lateral direction."

In the drawings, reference numeral 1 denotes a transfer apparatus in which a stick L in a substantially horizontal state with a strand of sausage or the like (hereinafter "sausage") S suspended therefrom is received at a first position A, is transferred to a second position B on a front side in a longitudinal direction SD of the stick L, and is then delivered to a conveyor means at the second position B.

The transfer apparatus 1 is comprised of a transversely transferring means 10 which causes the stick L placed at the aforementioned first position A to be transferred along a stick transverse transfer path HR in the longitudinal direction of the stick L from the first position A to the second position B, as well as a vertically transferring means 30 which, after moving the stick L at the second position B in a rightward lateral direction D from the stick transverse transfer path HR, lowers the stick L along a stick vertical transfer path VR and deliver it to a conveyor means 50.

At the first position A, a stick standby supporting means 60 is provided. The stick standby supporting means 60 has one supporting portion 61 which is on standby, supporting one end portion of the stick L and another supporting portion 62 which is provided backwardly of the one supporting portion 61 and is on standby, supporting the other end portion of the stick L. In preparation for the transverse transfer by the transversely transferring means 10, the stick L with the strand of sausage S formed in the form of a series of loops and suspended therefrom is kept on the stick standby supporting means.

The one supporting portion 61 is an L-shaped hook-like metal fitting (see FIG. 2) which is provided at an end portion of an arm 64 secured to a rotating means 65 such as a pneumatic rotary actuator or the like provided on one bracket 63 mounted on a below-described frame body 24. The arm 64 is subjected to reciprocal rotational drive from the rotating means 65. On the other hand, the other supporting portion 62 is an L-shaped hook-like metal fitting which is provided on another bracket 66 mounted on the below-described frame body 24, and is set at an immobile position. The aforementioned one supporting portion 61 is positioned at either one of a position for supporting the stick L in the horizontal state together with the other supporting portion 62 through reciprocal rotation and a retreated position where it does not interfere with the stick and the sausage at the time of the transverse transfer of the stick.

If such a stick standby supporting means 60 is provided, even if, after delivering the stick L to the vertically transferring means 30 at the second position B, a below-described pair of stick transverse transfer members 11 and 12 of the transversely transferring means 10 are delayed in returning to the first position A for taking up an ensuing stick L, it is possible to keep the ensuing stick L on the stick standby supporting means 60. Therefore, it is possible to avoid a delay in supplying the ensuing stick to the apparatus, and the aforementioned stick transverse transfer members 11 and 12 can immediately start return movement to the first position A after delivering the stick L to the vertically transferring means 30 at the second position B. Hence, it is possible to shorten the waiting time until the takeup of the stick from the stick standby supporting means 60 by the stick transverse transfer members 11 and 12.

Thus, as shown in the drawings, the one supporting portion 61 of the stick standby supporting means 60 is secured to an output rotating shaft of the pneumatic rotary actuator, i.e., the rotating means 65 which reciprocatingly rotates, and the rotary actuator is mounted on the frame body 24 by means of the bracket 63. The other supporting portion 62 is also mounted on the frame body 24 by means of the bracket 66. The front-back pair of supporting portions 61 and 62 remain on standby in the state of supporting the both end portions of the stick L until the below-described stick transverse transfer members 11 and 12, which returned from the second position B to the first position A, are rotated by the rotation of the rotary actuators to take up the stick L from the supporting portions 61 and 62 by slightly scooping up the front and rear end portions of the stick L, thereby placing the stick L on the stick transverse transfer members 11 and 12. Thus, the stick standby supporting means 60 is on standby, supporting the both end portions of the stick with the sausage S suspended therefrom.

It should be noted that, instead of the above-described construction, the stick may be placed and supported on the stick transverse transfer members by causing the stick to fall onto the stick transverse transfer members from the both supporting portions 61 and 62 by rotatively retreating the both supporting portions 61 and 62 of the stick standby supporting means 60. Furthermore, as for the rotating means 65 of the stick standby supporting means 60, instead of the rotary actuator, the rotating means may be constituted by an air cylinder and a link mechanism for converting the telescopic motion of a rod of the air cylinder to reciprocal rotary motion, whereby a rotating shaft to which one supporting portion is secured may be reciprocatingly rotated.

The transversely transferring means 10, which takes up the stick L with the sausage S suspended therefrom from the above-described stick standby supporting means 60 and transfers the stick L in the transverse direction from the first position A to the second position B, includes a stick transfer body 13 having the front-back pair, in the transfer direction (longitudinal direction) of the stick L, of stick transverse transfer members 11 and 12 provided at its both end portions; a rail body 14 which is provided in such a manner as to extend in the longitudinal direction SD of the stick L to support the stick transfer body 13 and guide its linear movement between the first position A and the second position B; and a transverse wrapping connector traveling body 17 wound around and trained between a pair of transverse transfer wheels 15 and 16 provided in the vicinities of both end sides of the rail body 14. The stick transfer body 13 is secured to a part of the transverse wrapping connector traveling body 17, and is adapted to be reciprocatingly moved between the first position A and the second position B by the forward and reverse rotation of the aforementioned transverse transfer wheel 15 which is driven by a transverse transfer electric motor 18. Here, it is assumed that a determination of whether the stick transfer body 13 is at the first position A or the second position B is made according to whether the position of a longitudinally central portion of the stick transfer body 13 is at the first position A or the second position B.

As shown in FIGS. 2, 4, and FIGS. 5A to 5C, the stick transfer body 13 has a movable frame 19 extending in parallel to the rail body 14, as well as a moving body 21 which is mounted on the movable frame 19 so as to be located in the rightward lateral direction D of the movable frame 19, and which extends in parallel to the rail body 14 and with a shorter length than the movable frame 19. The aforementioned front-back pair of stick transverse transfer members 11 and 12 are respectively provided at both end portions of the movable frame 19.

The stick transverse transfer members 11 and 12 of the stick transfer body 13 are each formed in the form of an L-shaped hook, for example. The stick transverse transfer members 11 and 12 are respectively secured to shafts of stick transverse transfer member rotating means 22 and 23, e.g., rotary actuators. Both end portions 17E of the transverse wrapping connector traveling body 17 are respectively attached to front and rear portions of the aforementioned moving body 21, such that an endless shape is formed by the moving body 21 and the transverse wrapping connector traveling body 17. A front-back pair of guided portions 21A are provided on the moving body 21, and the guided portions 21A are linearly guided by the rail body 14, so that the moving body 21 is adapted to be reciprocatingly moved between the first position A and the second position B by the reciprocal traveling of the transverse wrapping connector traveling body 17.

The stick transfer body 13 at the first position A takes up from the stick standby supporting means 60 the one end portion of the stick L by the one stick transverse transfer member 11 and the other end portion of the stick L by the other stick transverse transfer member 12 to thereby place the stick L on the front-back pair of stick transverse transfer members 11 and 12 and support it substantially horizontally.

Figure 6:
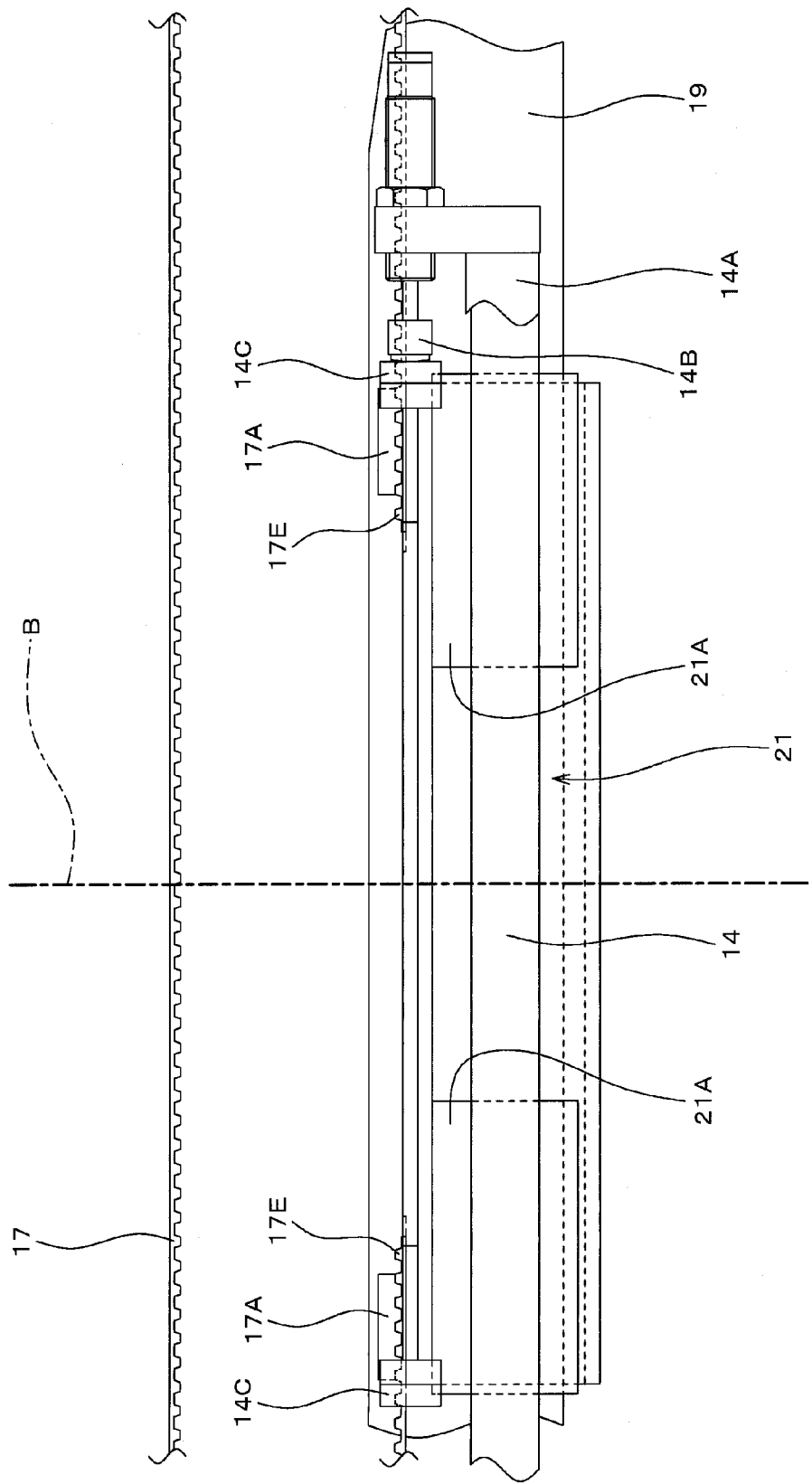
FIG. 6 is a rear view illustrating the portion of the moving body of the apparatus shown in FIG. 1.

As shown well in FIG. 6, in this embodiment, the transverse wrapping connector traveling body 17 of the above-described transversely transferring means 10 is a timing belt, and the transverse transfer wheels 15 and 16 are timing pulleys. By so doing, the lightweight of the transverse wrapping connector traveling body 17 is accomplished, and higher-speed traveling is made possible.

Since the moving body 21 which is thus constructed and reciprocatingly moves does not circulatingly move about the transverse transfer wheels 15 and 16, the length, in the longitudinal length of the stick, of the moving body 21 can be set to be longer than one pitch of the teeth of the transverse transfer wheels 15 and 16. In consequence, the length of the moving body 21 can be set to such a required length as to be able to reduce the sliding resistance while securing a sufficient length for stabilizing the sliding of the moving body 21 on the rail body 14.

In addition, since the moving body 21 and the movable frame 19 are constructed integrally, the weight of the stick L with the sausage S suspended therefrom is supported by the moving body 21 having a length yielding the above-described small sliding resistance. Further, since the transverse wrapping connector traveling body 17 which is directly connected to that moving body 21 reciprocatingly moves the moving body 21, the variation of the load on the transverse wrapping connector traveling body 17 can be suppressed by virtue of the connection to that moving body 21. In consequence, the wild movement or meandering motion of the transverse wrapping connector traveling body 17 is reduced to thereby permit the high-speed traveling of the transverse wrapping connector traveling body 17. In addition, since the length of the moving body 21 is shorter than the movable frame 19, the length of the rail body 14 can be made short.

A description will be given of such a moving body 21 and its guided portions 21A primarily with reference to FIG. 7.

Figure 7:
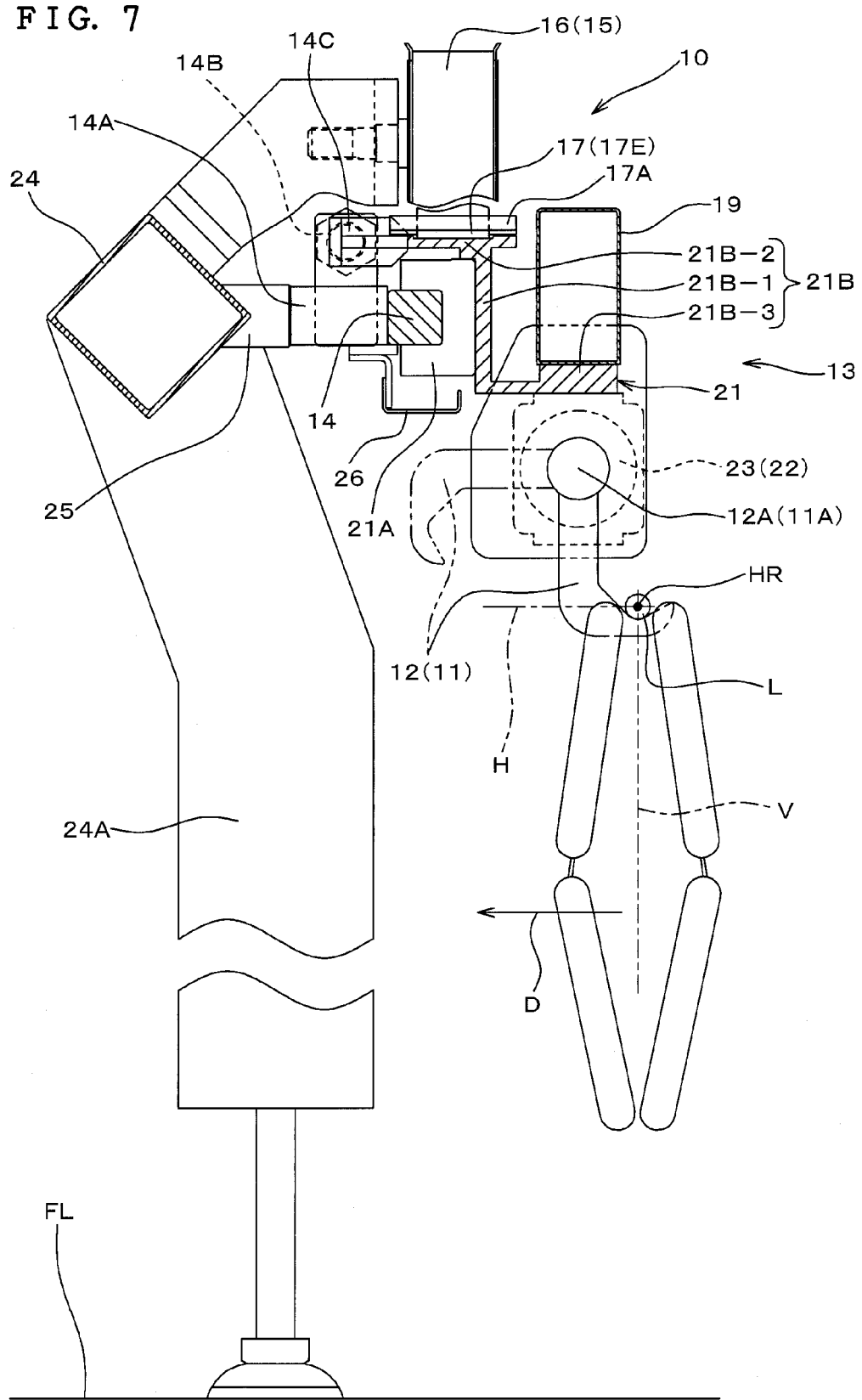
FIG. 7 is a vertical cross-sectional view, taken from the front side, of the moving body and its vicinities of the apparatus shown in FIG. 1.
Figure 9:
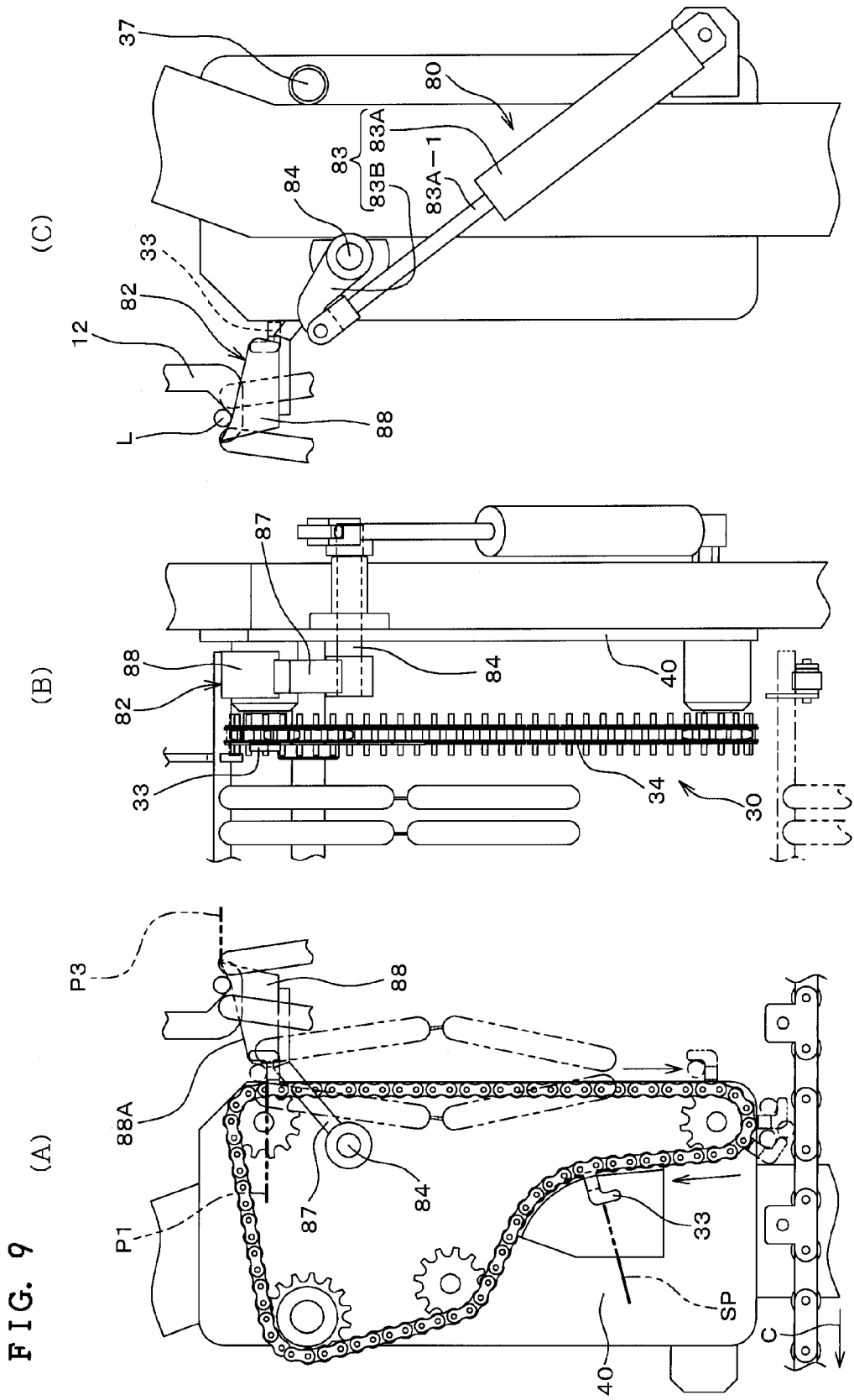

As shown in FIG. 7, the stick transverse transfer path HR along which the stick L is transferred extends on a line of intersection (straight line in an orthogonal direction to the plane of the drawing) between a substantially vertical plane V and a substantially horizontal plane H where the stick L supported substantially horizontally by the stick transverse transfer members 11 and 12 is positioned.

The rail body 14 is provided in the rightward lateral direction D of the rail body 14, is mounted, by means of a boss portion 25, on the frame body 24 supported by a pair of frame leg portions 24A, and extends in parallel to the aforementioned stick transverse transfer path HR in the rightward lateral direction D with respect to the aforementioned substantially vertical plane V and on an upper side with respect to the substantially horizontal plane H.

A rail body base 14A with a rectangular cross section is mounted on the boss portion 25 of the aforementioned frame body 24. Since the rail body 14 is fixed to the rail body base 14A, the rigidity of the rail body 14 can be maintained, so that the sliding resistance between the moving body 21 and the rail body 14 can be made uniform. A front-back pair of shock absorbers 14B are fixed to both end portions of the rail body base 14A (see FIG. 5B), and a corresponding abutment portion 14C provided on the moving body 21 which reciprocatingly moves is adapted to collide against the shock absorber 14B. This permits even higher-speed movement of the moving body 21.

The already-described stick transverse transfer member rotating means 22 and 23 are respectively provided on both end portions in the longitudinal direction SD of the movable frame 19 of the aforementioned stick transfer body 13, such that rotating shafts 11A and 12A of the stick transverse transfer members 11 and 12 are positioned in the rightward lateral direction D of the aforementioned stick transverse transfer path HR and below both the lower portion of the movable frame 19 and the lower portion of the rail body 14. At the second position B, the aforementioned stick transverse transfer members 11 and 12 are adapted to rotate upward (in the clockwise direction in FIG. 7) toward the rail body 14 and releases the support of the stick L, so as to deliver the stick L to the vertically transferring means 30.

As shown in FIG. 7, the moving body 21 mounted on the movable frame 19 of the stick transfer body 13 has a cross-sectionally cranked connecting portion 21B for connecting the guided portions 21A of the moving body 21 and the aforementioned movable frame 19. The connecting portion 21B has a first portion 21B-1 to which a vertical side surface of each guided portion 21A, which is fitted to the rail body 14 and is linearly guided, is secured; a second portion 21B-2 which is a portion connected to an upper portion of the first portion 21B-1 and to which the both end portions 17E of the transverse wrapping connector traveling body 17 are secured; and a third portion 21B-3 which is a portion connected to a lower portion of the first portion 21B-1 and to which a lower portion of the movable frame 19 is secured.

The first portion 21B-1 is disposed in a plane which is parallel to the aforementioned substantially vertical plane and in a plane positioned in the rightward lateral direction D of the movable frame 19. The second portion 21B-2 is positioned in a horizontal plane parallel to an upper surface of each guided portion 21A so as to cover the upper surface of each guided portion 21A. The third portion 21B-3 is provided in a substantially horizontal plane extending from the first portion 21B-1 in the direction of a substantially perpendicular plane.

The front-back pair of guided portions 21A secured to the aforementioned first portion 21B-1 are fitted to the rail body 14, and are secured to the second portion 21B-2 in a state in which each of the end portions 17E of the transverse wrapping connector traveling body 17 is held down by a front-back pair of holding plates 17A.

Thus, since the rail body 14 extends laterally of the substantially vertical plane V and upwardly of the substantially horizontal plane H in parallel to both of these planes, as shown in FIG. 7, the rail body 14 is low in height and is compact.

In addition, since the rotating shafts 11A and 12A of the stick transverse transfer members 11 and 12 are positioned below the lower portion of the movable frame 19, the vertical dimension of the movable frame 19 is short. Further, since the rotating shafts 11A and 12A of the stick transverse transfer members 11 and 12 are positioned below the lower portion of the rail body 14, the stick transverse transfer members 11 and 12 at their upper rotational position are prevented from interfering with the rail body 14. In consequence, the lateral distance between the stick transverse transfer path HR and the rail body 14 is short. Additionally, as for the moving body 21, its second portion 21B-2 which is driven by the transverse wrapping connector traveling body 17 is present in a plane parallel to the upper surface of each guided portion 21A, so that there is no lateral offset between them. By virtue of these arrangements, the moment acting on the rail body 14 can be made small. In consequence, the sliding resistance between the rail body 14 and the guided portions 21A is reduced.

Since the moving body 21 has a cranked shape having the first portion 21B-1, the second portion 21B-2, and the third portion 21B-3, the movable frame 19 and the both end portions 17E of the transverse wrapping connector traveling body 17 can be disposed at high positional accuracy with respect to the rail body 14.

It should be noted that although the endless transverse wrapping connector traveling body 17 in this embodiment has its reciprocal traveling path located in a vertical plane, it is possible to adopt a construction in which this traveling path is located in a horizontal plane. Even in such a construction, the movable frame 19 is secured to the moving body 21, and the guided portions 21A secured to the moving body 21 are supported by the rail body 14, so that high-speed movement of the moving body 21 (i.e., stick transfer body 13) is made possible.

Figure 2:
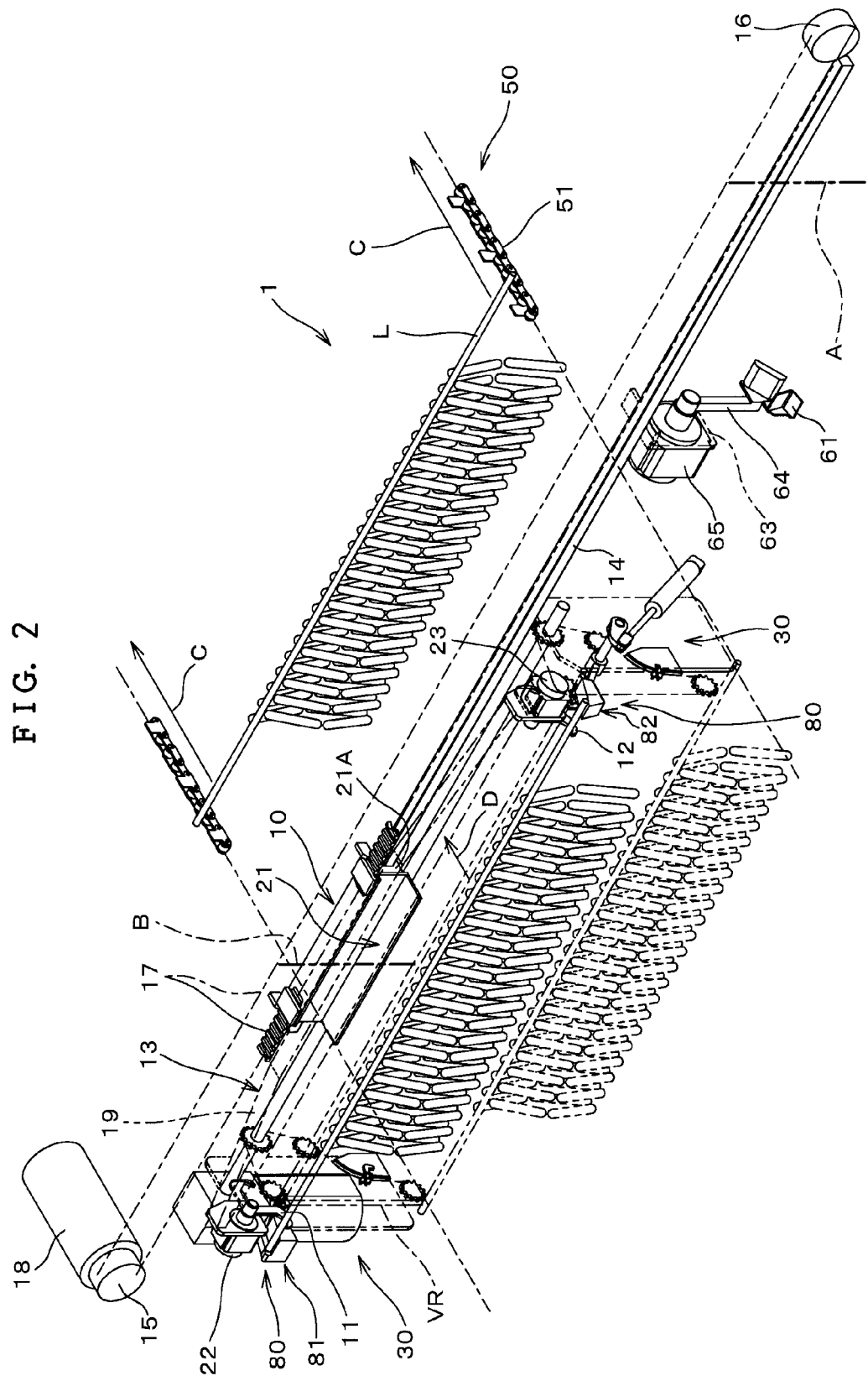
FIG. 2 is a perspective view illustrating a schematic construction of the essential portions of the apparatus in accordance with the first embodiment of the invention, and illustrates a state in which the stick transfer body of the transversely transferring means is located at a second position.
Figure 3:
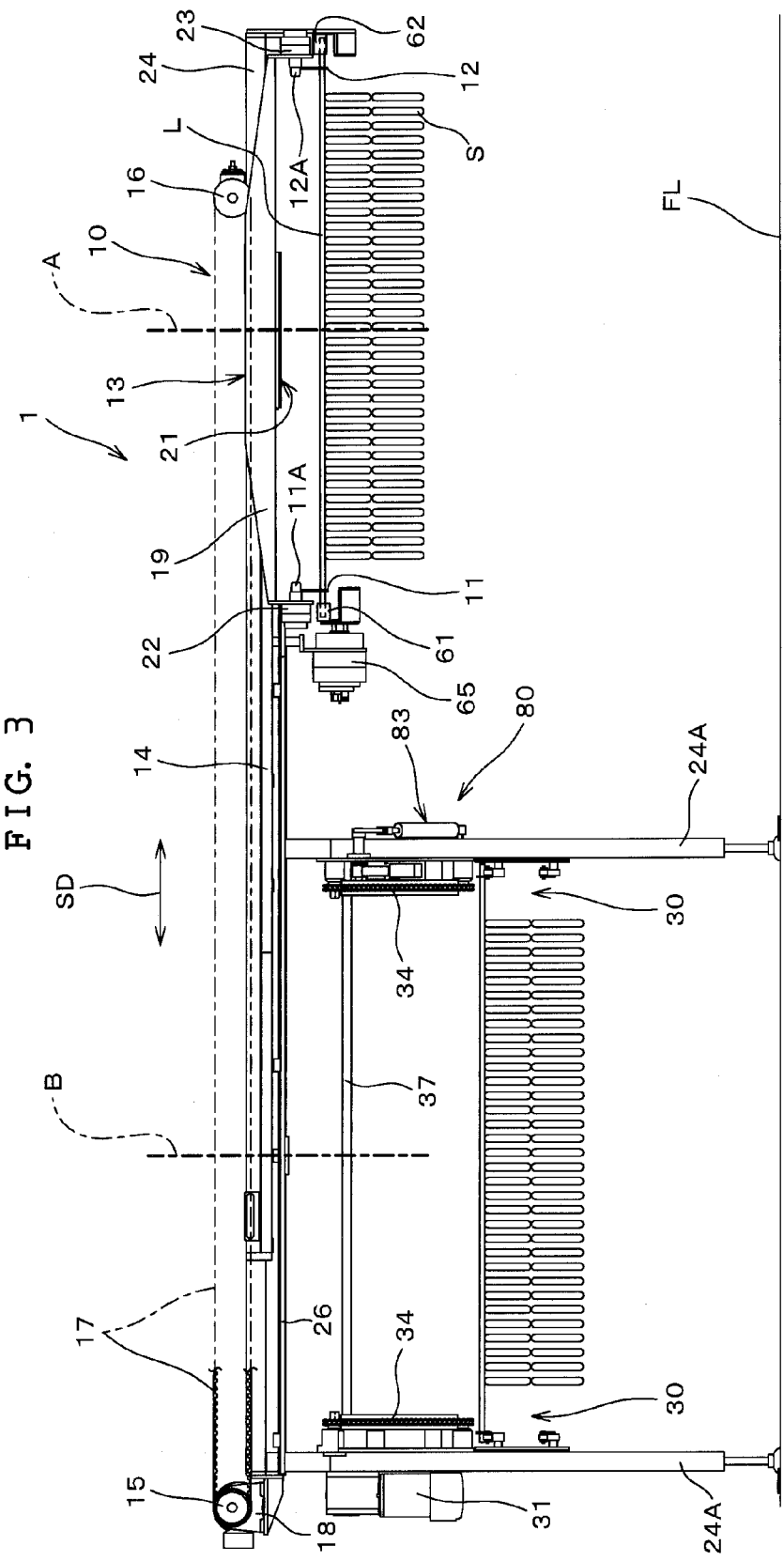
FIG. 3 is a front elevational view in accordance with this embodiment in the state of FIG. 1.
Figure 4:
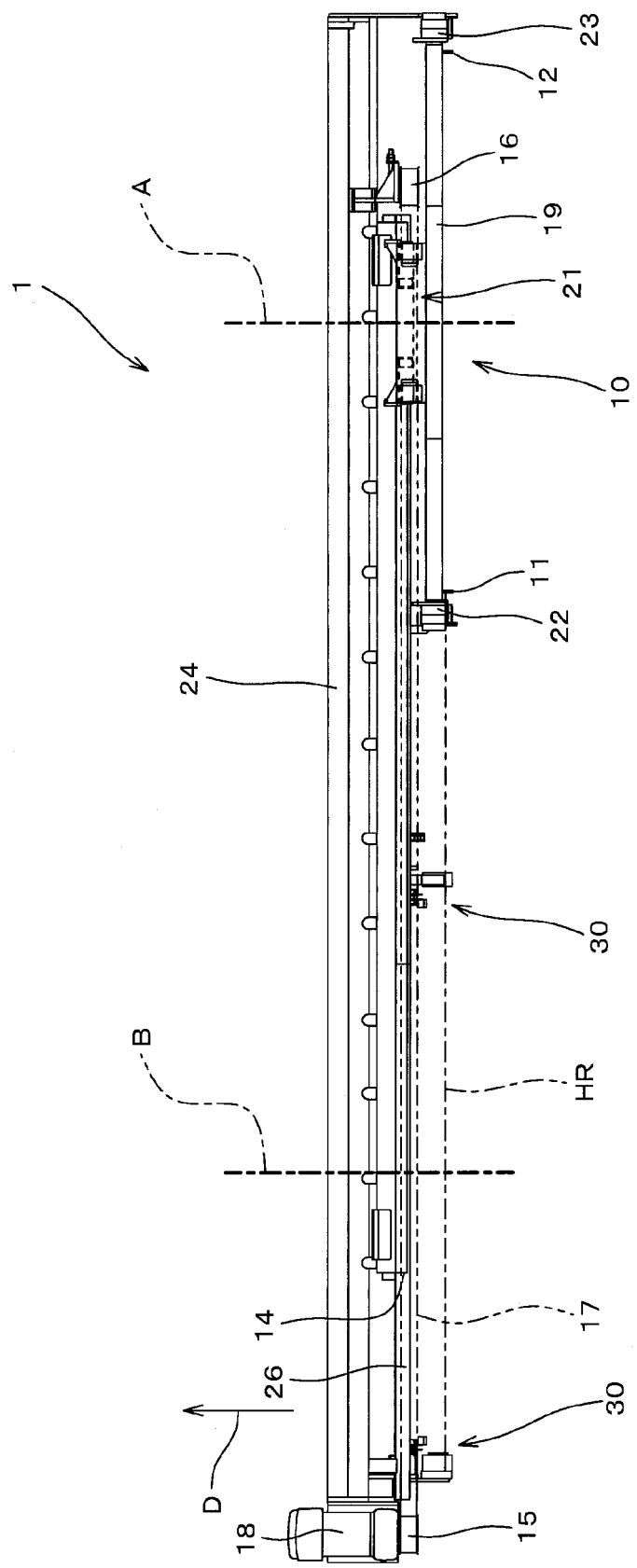
FIG. 4 is a plan view in accordance with this embodiment in the state of FIG. 1.

As shown in FIG. 2, disposed at the second position B is the vertically transferring means 30 having a stick sliding means 80 for guiding the sliding of the stick L which is disengaged from the stick transverse transfer members 11 and 12 of the transversely transferring means 10 which reached the second position B, i.e., the stick L which slipped off the stick transverse transfer members 11 and 12 in this embodiment. The stick sliding means 80 is for guiding the sliding of the stick L, which slipped off the stick transverse transfer members 11 and 12, toward below-described stick vertical transfer members 33 which are at a standstill at an upper position P1 within a lowering zone X provided in the rightward lateral direction D of the stick L supported by the stick transverse transfer members 11 and 12 which are at a standstill at the second position B. The stick sliding means 80 has a front stick sliding member 81 for guiding the sliding of the front end portion of the stick L and a rear stick sliding member 82 for guiding the sliding of the rear end portion of the stick L. The front and rear stick sliding members 81 and 82 have stick guide portions 86 and 88, respectively, which have formed thereon respective inclined surfaces for guiding the sliding of the stick toward corresponding ones of two pairs of the front and rear stick vertical transfer members 33 (see FIGS. 8A to 8C and FIGS. 10A to 10C) at the upper position P1 of the below-described vertically transferring means 30. The front and rear stick sliding members 81 and 82 are respectively located outside a range defined between the two pairs of stick vertical transfer members 33 in the front-back direction, but in close proximity to these stick vertical transfer members 33.

The front stick sliding member 81 is disposed at a stick sliding guiding position P2 with a stationary posture, but the rear stick sliding member 82 is adapted to reciprocate, by means of a stick sliding member driving means 83, between a stick sliding guiding position P3 for delivering the stick to the below-described stick transfer member of the corresponding vertically transferring means 30 and a retreated position P4.

The stick sliding guiding position P3 of the rear stick sliding member 82, when viewed in the front-back direction, is at the same position as that of the front stick sliding member 81 which is at the stationary position, as shown in FIGS. 9A to 9C. The rear stick sliding member 82 at this stick sliding guiding position P3 has the same posture as the front stick sliding member 81, and is provided in such a manner as to straddle between stick transverse transfer path HR and the stick vertical transfer path VR. The retreated position P4 is a position to which the rear stick sliding member 82 is retreated so as not to hamper the forward movement of the stick transverse transfer members 11 and 12 of the transversely transferring means 10.

As shown in FIGS. 9A to 9C and FIGS. 10A to 10C, the stick guide portions 86 and 88 of such stick sliding members 81 and 82 have sliding guide surfaces 86A and 88A which are downwardly inclined toward the stick vertical transfer members 33. These sliding guide surfaces 86A and 88A are positioned immediately below the both end portions of the stick L placed on the stick transverse transfer members 11 and 12 at a standstill at the second position B. The stick L which slipped off the stick transverse transfer members 11 and 12 after being released from the support by the stick transverse transfer members 11 and 12 slides on the sliding guide surfaces 86A and 88A and then fall down from these sliding guide surfaces 86A and 88A. Each of the below-described stick vertical transfer members 33 which receive this stick has a stick placing portion 33A for receiving and placing thereon the stick L which fell down from the sliding guide surfaces 86A and 88A. The length of the stick placing portion 33A is slightly longer than the diameter of the stick L. As shown in FIGS. 10A to 10C, the sliding guide portion 86 of the front stick sliding member 81 has an L-shaped cross section formed by the sliding guide surface 86A and a restricting portion 86B for restricting the longitudinal movement of the stick by abutting against the forward end face of the stick. Since a bracket 85 for the front stick sliding member 81 is positioned forwardly of the restricting portion 86B, it is unnecessary to retreatingly rotate the bracket 85 from the stick vertical transfer path VR when the stick undergoes lowering movement along the stick vertical transfer path VR.

The front stick sliding member 81 has the stick sliding guide portion 86 which is supported by the bracket 85 mounted on one base 39, while the rear stick sliding member 82 has the stick sliding guide portion 88 which is secured to an arm portion 87 mounted on a rotating shaft 84 which is passed through another base 40, and reciprocatingly rotates between the aforementioned stick sliding guiding position P3 and the retreated position P4. The rotating shaft 84 is driven by the stick sliding member driving means 83. The stick sliding member driving means 83 in this embodiment is constructed by including an air cylinder 83A which is swingably mounted on the other base 40 and an arm-like connecting member 83B which is connected to a rod 83A-1 of the air cylinder 83A and to the rotating shaft 84.

Since the rotating shaft 84 of the rear stick sliding member 82 is disposed inside a circulatory traveling area of a corresponding one of a below-described front-back pair of vertical wrapping connector traveling bodies 34 to which the stick vertical transfer members 33 are attached, it becomes possible to make compact the apparatus concerning a stick conveying direction C of the conveyor means 50.

As shown in FIGS. 8A to 8C and FIGS. 10A to 10C, the vertically transferring means 30 disposed at the second position B in the front-back direction is provided on the lower side of the transverse wrapping connector traveling body 17 in order to receive the stick L whose sliding has been guided by the above-described stick sliding means 80. The vertically transferring means 30 has the front-back pair of vertical wrapping connector traveling bodies 34, respectively, which are each wound around and trained among vertical transfer wheels 32 rotatively driven by a vertical transfer electric motor 31 to form the lowering zone X for downwardly moving the stick L, and to which the stick vertical transfer members 33 are attached.

Since the vertical wrapping connector traveling body 34 are provided in the same direction as the already-described frame body 24 which is provided in the rightward lateral direction D of the stick L being supported by the stick transverse transfer members 11 and 12 when they are at a standstill at the second position B, as shown in FIGS. 2, 5A to 5C, and 7, the apparatus size in the traveling direction (C direction) of the conveyor means 50 becomes compact.

The vertical transfer wheels 32 for guiding and driving the vertical wrapping connector traveling bodies 34 of the above-described vertically transferring means 30 include a front-back pair of upper wheels 32A and a front-back pair of lower wheels 32B each provided immediately vertically below each of the front-back pair of upper wheels 32A, the front-back pair of upper wheels 32A and the front-back pair of lower wheels 32B corresponding to the front-back pair of vertical wrapping connector traveling bodies 34. The front-back pair of vertical wrapping connector traveling bodies 34 forms the lowering zone X which is positioned on a vertical line ranging from the front-back pair of upper wheels 32A to the front-back pair of lower wheels 32B.

Each stick vertical transfer member 33 attached to the vertical wrapping connector traveling body 34 is shaped in the form of an L-hook which is oriented upward during its downward movement in the lowering zone X, and is adapted to change its direction at a lower position in the aforementioned lowering zone X such that the L-hook shape is oriented downward, while rotatively moving together with the lower wheel 32B, to thereby cause the stick L received from the stick sliding means 80 at the upper position P1 to fall downward toward a pair of conveyor endless traveling bodies 51 of the conveyor means 50 so as to deliver the stick L onto the conveyor endless traveling bodies 51 of the conveyor means 50.

With the vertically transferring means 30 of such an embodiment, since the stick L placed on the stick vertical transfer members 33, which change their direction by the rotative movement of the stick vertical transfer members 33 about the respective lower wheels 32B, is placed on the conveyor endless traveling bodies 51 of the conveyor means 50, a separate mechanism for releasing the support of the stick L by the stick vertical transfer members 33 at a position close to the conveyor is unrequired. Hence, the apparatus can be simplified and made compact. In addition, the delivery of the stick to the conveyor means 50 can be completed within a short time period.

Each vertical wrapping connector traveling body 34, after passing the lowering zone X formed on the vertical line between the upper wheel 32A and the lower wheel 32B, is wound around a drive wheel 32C provided at a position in the rightward lateral direction D of the upper wheel 32A and upwardly of the lower wheel 32B, to thereby form a rising zone Y where the stick vertical transfer member 33 is upwardly moved from the lower wheel 32B to the drive wheel 32C. The drive wheel 32C is adapted to rotate by receiving a driving force from the vertical transfer electric motor 31 so as to cause the vertical wrapping connector traveling body 34 to travel. As such, the stick vertical transfer members 33, after moving downward through the lowering zone X, moves through the rising zone Y, and returns again to the upper position P1 in the lowering zone X.

With the vertically transferring means 30 thus constructed, since the drive wheel 32C is provided in the rightward lateral direction D of the upper wheel 32A and the lower wheel 32B, which are arranged with a vertical center distance set on the basis of the suspended length of the sausage loops, each vertical wrapping connector traveling body 34 having an overall length which is determined by the suspended length of the sausage loops and the number of the stick vertical transfer members 33 can be provided with a desired form of traveling path according to the position of disposition of the drive wheel 32C. In consequence, the vertically transferring means 30 is able to be equipped with the vertical wrapping connector traveling bodies 34 having a compact traveling path.

In addition, since the arrangement provided is such that the upper wheel 32A and the lower wheel 32B are driven by the vertical wrapping connector traveling body 34 engaged with the drive wheel 32C, a drive system ranging from the vertical transfer electric motor 31 to the vertical wrapping connector traveling body 34 can be simplified.

As for each vertical wrapping connector traveling body 34 which forms the rising zone Y, its traveling position in the rising zone Y is determined by a winding angle determining member 35 for pressing the vertical wrapping connector traveling body 34 in a range between the lower wheel 32B and a tension wheel 32D located thereabove in the rising zone Y, such that a winding angle α at the lower wheel 32B is set to a desired angle. In this embodiment, the winding angle determining member 35 is constituted by a plate-like member for guiding the sliding of the vertical wrapping connector traveling body 34.

Since the drive wheel 32C and the winding angle determining member 35 are thus provided, the vertical wrapping connector traveling body 34 can be wound around the lower wheel 32B at the winding angle α for determining the position at which the stick vertical transfer member 33 can release its support of the stick during the rotative movement of the stick vertical transfer member 33 about the lower wheel 32B, or at an angle exceeding that angle.

Each vertical wrapping connector traveling body 34 is thus wound around and trained among the drive wheel 32C, the upper wheel 32A, the lower wheel 32B, the winding angle determining member 35, and the tension wheel 32D. The tension wheel 32D is provided between the winding angle determining member 35 and a drive shaft 37 of the drive wheel 32C so as to press the vertical wrapping connector traveling body 34, which forms the rising zone Y, against the winding angle determining member 35. The need for its use can be selected, as required, in the light of the relationship with the overall length of the vertical wrapping connector traveling body 34. The stick vertical transfer path VR includes a portion which is parallel to the lowering zone X.

It should be noted that, in this embodiment, the vertical transfer electric motor 31 is in a form in which a speed reducer 31G is integral therewith, so that the drive shaft 37 is connected to the motor 31 by means of an output shaft 31A of the speed reducer 31G. Even in this form, the construction adopted in the present invention is such that the drive shaft 37 is directly coupled to an output shaft 31A of the vertical transfer electric motor 31.

It should be noted that although the winding angle determining member 35 in this embodiment is formed as a sliding guiding body constituted by a plate-like member, a sprocket, for example, may be used in substitution of this sliding guiding body to determine the traveling position of the chain.

In this embodiment, a plurality of (in the illustrated example, two) stick vertical transfer members 33 are attached to each vertical wrapping connector traveling body 34 at equal intervals in the traveling direction, as shown in FIGS. 8A to 8C and FIGS. 10A to 10C.

The vertical wrapping connector traveling body 34 is arranged such that when a first stick vertical transfer member, which is one of the plurality of stick vertical transfer members 33, is at a standstill at the upper position P1, a second stick vertical transfer member, which is another one of the plurality of stick vertical transfer members 33, is at a standstill at a predetermined position in the rising zone Y after completing the delivery of the stick to the conveyor means 50.

By so doing, a required distance for the stick vertical transfer member 33 to return to the upper position P1 becomes short, so that the absence time of the stick vertical transfer member 33 at the upper position P1 is short, thereby enhancing the productivity of the apparatus.

The vertical wrapping connector traveling body 34 of the vertically transferring means 30 in this embodiment is a chain, and the upper wheel 32A and the lower wheel 32B are sprockets. In addition, the stick vertical transfer member 33 is a hook member which is attached to the chain, is oriented upward in the lowering zone X, and is oriented downward at the position of the lower wheel 32B.

Referring to FIG. 10B, reference numeral 36 denotes a chain guide, and the chain guide 36 is provided, as required, in accordance with the operating conditions. The chain guide 36 is disposed in such a manner as to extend vertically between the upper sprocket 32A and the lower sprocket 32B. The chain guide 36 has a groove 36A formed for guiding pins 34A of the chain 34 from which the pins 34A project to the left and right. The pins 34A of the chain 34 move while their outer peripheries are brought into sliding contact with the groove 36A.

In this embodiment, since the vertical wrapping connector traveling body 34 is a chain, as shown in FIGS. 10B and 10C, it is possible to easily construct a structure in which the hook members serving as the stick vertical transfer members 33 do not interfere with the chain guide 36 for guiding both sides (obverse and reverse sides) of the chain. Hence, it is possible to realize at low cost an apparatus having a chain layout which is complex in shape.

If the above-described construction is adopted for guiding the pins 34A of the chain 34 from which the pins 34A project leftward and rightward, it is possible to prevent the toppling of the chain at the time of vertical transfer owing to the weight of the stick, so that the chain is able to undergo high-speed movement smoothly.

In this embodiment, as shown in FIGS. 3 and 10A to 10C, the vertical wrapping connector traveling body 34 of a forward direction FD is provided, together with the front stick sliding member 81, on the base 39 of the forward direction FD mounted on the front leg portion of the pair of frame leg portions 24A, arranged at transversely symmetrical positions about the second position B, of the frame body 24 installed on a floor FL. Meanwhile, as shown in FIGS. 3 and 8A to 8C, the vertical wrapping connector traveling body 34 of a backward direction BD is provided, together with the rear stick sliding member 82 and the stick sliding member driving means 83, on the base 40 of the backward direction BD mounted on the leg portion 24A of the backward direction BD.

In this embodiment, since the pair of bases 39 and 40 to which the component members of the vertically transferring means 30 are mounted are respectively fixed to the front-back pair of frame leg portions 24A, separate structures for mounting the pair of bases are made unnecessary, so that the apparatus can be simplified and made compact.

In this embodiment, as shown in FIGS. 3, 8, and 10A to 10C, the front-back pair of drive wheels 32C are mounted on the drive shaft 37 which is directly coupled to the output shaft 31A of the vertical transfer electric motor 31 and extends substantially horizontally. The vertical transfer electric motor 31 is provided on a motor base 38 mounted on the frame leg portion of the forward direction FD.

Thus, since the front-back pair of drive wheels 32C are directly coupled to the output shaft 31A of the vertical transfer electric motor 31, the drive system ranging from the vertical transfer electric motor 31 to the vertical wrapping connector traveling body 34 is simplified. In addition, since the front-back pair of stick vertical transfer members 33 are driven by the identical drive shaft 37, the lowering movement of the front-back pair of stick vertical transfer members 33 is synchronized, thereby making it possible to maintain the horizontal state of the stick L in its lowering movement. Accordingly, trouble during the lowering movement is unlikely to occur.

Since the motor base 38 is fixed to the frame leg portion 24A, a separate structure for mounting the motor base is not required, so that the apparatus can be simplified and made compact.

In this embodiment, the transversely transferring means 10 has the rail body 14, the stick transfer body 13, the transverse wrapping connector traveling body 17, and the transverse transfer electric motor 18, while the vertically transferring means 30 has the stick sliding means 80, the vertical wrapping connector traveling bodies 34, and the vertical transfer electric motor 31. Since these members are provided in the rightward lateral direction D of the stick transverse transfer path HR, the apparatus is made compact.

Since the stick transfer body 13 fitted to the rail body 14 of the transversely transferring means 10 is adapted to be driven by the transverse transfer electric motor 18 and the transverse wrapping connector traveling body 17, and the stick vertical transfer members 33 for placing only one stick thereon is adapted to be driven by the vertical transfer electric motor 31 and the vertical wrapping connector traveling bodies 34, the transverse and vertical transfer members 11, 12, and 33 of the stick transfer apparatus 1 can be moved at high speed.

In this embodiment, as shown in FIG. 7, an elongated oil prevention tray 26 having a groove-shaped cross section for receiving a lubricant which can drop from the guided bodies 21A or the rail body 14 is disposed along the rail body 14 immediately therebelow.

Hence, even if a lubricant, e.g., grease, lubricating the guided bodies 21A and the rail body 14 should drop, the oil prevention tray 26 receives all the dropped grease, so that the scattering of the grease within the apparatus is prevented, and the apparatus is made highly hygienic.

With the apparatus of this embodiment constructed as described above, the stick with a strand of sausage suspended therefrom in the form of a series of loops is transferred in the following procedure.

(1) The stick L with the strand of sausage suspended therefrom in the form of a series of loops by an unillustrated sausage loop forming apparatus is brought to the stick standby supporting means 60 from the rightward lateral direction D in FIG. 1, and the front end portion and the rear end portion of the stick L are respectively supported by the one supporting portion 61 (of the forward direction FD) and the other supporting portion 62 (of the backward direction BD), which are located at the supporting position, of this stick standby supporting means 60. The stick L on this stick standby supporting means 60 then remains on standby in preparation for the transverse transfer by the transversely transferring means 10 as an ensuing step.

(2) The stick transfer body 13 of the transversely transferring means 10 is brought to the first position A of the backward direction BD by the traveling of the transverse wrapping connector traveling body 17 while being guided by the rail body 14, and stops there. The front-back pair of stick transverse transfer members 11 and 12 of the stick transfer body 13 are rotated upwardly by the actuation of the stick transverse transfer member rotating means 22 and 23 such as rotary actuators, and thereby take up the stick L from the both supporting portions 61 and 62. When the stick L is taken up, the one supporting portion 61 located in the forward direction FD is rotated downward to the retreated position by the rotating means 65 (see FIG. 2 as well), and retreats from the stick transverse transfer path HR. The stick transverse transfer members 11 and 12 which supported the stick L then waits at the first position A for the start of ensuing stick transverse transfer.

(3) On the other hand, the stick vertical transfer members 33 supporting the stick L waits at the upper position P1 for the start of lowering. When the conveyor endless traveling bodies 51 having a sufficient space for delivering the stick L arrive, the stick vertical transfer electric motor 31 is started to intermittently move the vertical wrapping connector traveling bodies 34 circulatingly. When the stick vertical transfer members 33 reach the lower end of the lowering zone X on the vertical line and rotate about the respective lower wheels 32B, the stick vertical transfer members 33 formed by the L-shaped hook members are gradually made to change their direction further downward to the lateral direction. Consequently, the stick L automatically drops from the stick vertical transfer members 33. When the stick vertical transfer members 33 which delivered the stick L to the conveyor endless traveling bodies 51 reach the stop position SP in the rising zone Y, the stick vertical transfer electric motor 31 is stopped, and the stick vertical transfer members 33 on which the stick L is not placed are disposed in pairs at the upper position P1 and the stop position SP, respectively.

(4) The lower wheels 32B are positioned directly above the conveyor endless traveling bodies 51 of the conveyor means 50, so that the stick L which drops from the stick vertical transfer members 33 is immediately received by the conveyor endless traveling bodies 51, and is transported in the C direction toward the apparatus of an ensuing processing step.

(5) When an unillustrated sensor detects the stick vertical transfer member 33 which reached the stop position SP, the stick transfer body 13 which was on standby at the first position A is pulled by the transverse wrapping connector traveling body 17 which is caused to travel by the transverse transfer wheel 15 driven by the transverse transfer electric motor 18 started by a command from the sensor, and the stick transfer body 13 is thereby moved in the forward direction FD while being guided by the rail body 14. At that juncture, the one supporting portion 61 of the aforementioned stick standby supporting means 60 is at the retreated position, and does not constitute an obstacle in the movement of the stick transfer body 13 in the forward direction FD. When the stick transverse transfer members 11 and 12 pass the position of the one supporting portion 61, that one supporting portion 61 is returned from the retreated position to its original position to prepare for the placing of an ensuing stick onto the stick standby supporting means 60.

(6) The stick transfer body 13 makes an advancing movement along the stick transverse transfer path HR toward the second position B. At this juncture, the rear stick sliding member 82 of the front-back pair of stick sliding members 81 and 82 of the stick sliding means 80 arranged at the second position B is at the lower retreated position P4 (see FIGS. 8A to 8C), and therefore does not constitute an obstacle to the forward movement of the stick transfer body 13. When the stick transfer body 13 reaches the second position B, the stick transfer body 13 stops there, as shown in FIG. 2. Then, the stick sliding member driving means 83 is actuated, so that the rear stick sliding member 82 which was at the retreated position P1 is rotated upward and stops at the stick sliding guiding position P3 (see FIG. 9), as shown in FIG. 2. The rear stick sliding member 82 is at a stick sliding guiding position at which it is able to receive the stick L in conjunction with the front stick sliding member 81.

(7) Next, the front-back pair of stick transverse transfer members 11 and 12 of the stick transfer body 13 are rotated upward, and the stick L is released from the support by these stick transverse transfer members 11 and 12, slips off, and drops. Thereupon, the stick L is received by the aforementioned front and rear stick sliding members 81 and 82, and slides on them down in the rightward lateral direction D (see FIGS. 10A to 10C). When the stick vertical transfer members 33 on the stick vertical transfer path VR in the rightward lateral direction D of the stick transverse transfer path HR receive the stick L which dropped from the stick sliding members 81 and 82, the stick sliding member driving means 83 is actuated, so that the rear stick sliding member 82 moves to the retreated position P1 and retreats from the stick vertical transfer path VR and the stick transverse transfer path HR. After the stick slips off the stick transverse transfer members 11 and 12, the stick transfer body 13 immediately returns to the first position A and prepares for the transverse transfer of an ensuing stick. Even in a situation in which the conveyor endless traveling bodies 51 are congested with sticks, and the start of lowering movement of the stick vertical transfer members 33 is delayed, the stick transverse transfer members 11 and 12, without needing to wait for that start of lowering movement, can start retreating movement toward the first position A immediately after the stick slips off the stick transverse transfer members 11 and 12, so that the stick transverse transfer cycle is short.

(8) The stick vertical transfer members 33 which supported the stick L which dropped from the stick sliding members 81 and 82 wait for the start of the ensuing lowering at the upper position P1.

In the present invention, in addition to the above-described first embodiment, it is possible to adopt various forms in terms of the layout relationship between, on the one hand, the positions of connection of the both end portions 17E of the transverse wrapping connector traveling body 17 to the moving body 21 and, and on the other hand, the transverse transfer wheels 15 and 16. Although, in the first embodiment, the transverse transfer wheels 15 and 16 are provided upwardly of the moving body 21, and the both end portions 17E of the transverse wrapping connector traveling body 17 are connected to an upper portion of the moving body 21, the transverse transfer wheels 15 and 16 in a second embodiment shown in FIGS. 11A and 11B are alternatively provided at a height lower than the moving body 21, and the transverse wrapping connector traveling body 17 is connected to a lower portion of the moving body 21. In the apparatus of this second embodiment, the height of the apparatus can be made even lower.

Figure 12:
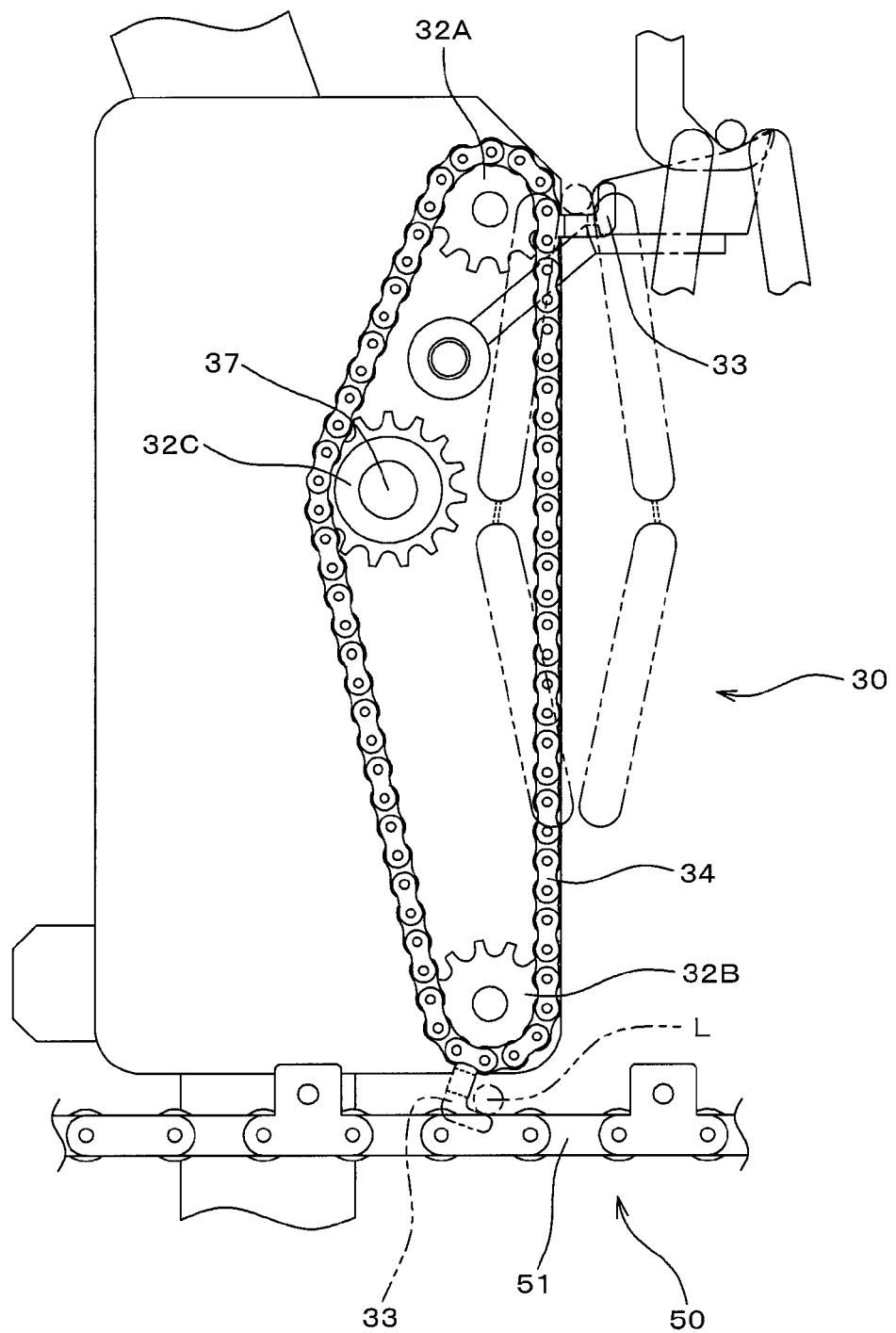
FIG. 12 is a diagram corresponding to FIG. 9A and illustrates the front vertical wrapping connector traveling body and its vicinities of the vertically transferring means in accordance with a third embodiment of the invention.

Hereafter, with reference to FIG. 12, a description will be given of a third embodiment in which only one front-back pair of stick vertical transfer members are provided, and the winding angle determining member is not provided. FIG. 12 shows the other vertical wrapping connector traveling body 34 (of the backward direction BD). The arrangement adopted is such that the unillustrated one vertical wrapping connector traveling body (of the forward direction FD) is symmetrical with the other vertical wrapping connector traveling body about the second position B in the front-back direction, in the same way as in the second embodiment. Each vertical wrapping connector traveling body 34 is adapted to circulatingly travel by being wound around and trained among the upper wheel 32A, the lower wheel 32B, and the drive wheel 32C. The sole front-back pair of stick vertical transfer members are attached to the front-back pair of vertical wrapping connector traveling bodies 34. In this embodiment, since the overall length of the endless vertical wrapping connector traveling body 34 is shorter than in the first embodiment, the vertical wrapping connector traveling body 34 can be wound around the lower wheel 32B at a required angle in accordance with the traveling position of the vertical wrapping connector traveling body 34 based on only the drive wheel 32C arranged at a required position.

Thus, in the present invention, since the vertically transferring means 30 is capable of high-speed movement, it is possible to enhance the productivity of the apparatus even only one front-back pair of stick vertical transfer members which are attached to the front-back pair of vertical wrapping connector traveling bodies 34 are provided as in the third embodiment. Furthermore, if the vertical wrapping connector traveling body 34 can form the lowering zone and the rising zone by being wound around and trained between the upper wheel 32A and the lower wheel 32B at a winding angle α which permits the release of support of the stick by the stick vertical transfer members 33, it is possible to disuse the winding angle determining member in the first embodiment as in the apparatus of this third embodiment.

In such an apparatus of the third embodiment, the arrangement adopted is such that an interval between the lower wheel 32B and the conveyor endless traveling body 51, e.g., a chain, of the conveyor means 50 is made narrow, and after the stick L on the stick vertical transfer members 33 has been placed on the chains, the stick vertical transfer members 33 are moved away from the stick L (see the portion indicated by the two-dotted line in FIG. 12). In consequence, it is possible to reduce the colliding force of the stick against the chains at the time of the delivery of the stick onto the chains. It should be noted that this arrangement is also applicable to the first embodiment.

Although, in the already-described embodiments, the vertically transferring means 30 and the frame body 24 are provided in the rightward lateral direction D of the stick transverse transfer path HR, the vertically transferring means and the frame body may alternatively be provided in the leftward lateral direction of the stick transverse transfer path HR. Still alternatively, the vertically transferring means and the frame body may be provided in-face-to-face relationship on the left and right sides of the stick transverse transfer path HR, respectively, and whether the vertically transferring means is to be provided on the left or right can be selected, as required. In these arrangements, although a separate structure for mounting the vertically transferring means is required, since the vertically transferring means has the stick sliding means for moving the stick in the leftward lateral direction, it is possible to attain the high-speed movement of the vertically transferring means and the miniaturization of the vertically transferring means.

In addition, in the already-described embodiments, the rotational speed of the transverse transfer electric motor 18, during its starting and stopping, may be subjected to speed increasing/decreasing control by an unillustrated control means. In the present invention, since the resistance in movement of the moving body 21 of the transversely transferring means 10 can be made small, as described above, if this arrangement is provided, the transverse transfer electric motor 18 is able to accurately control the moving speed and position of the moving body 21. As a result, during the starting and stopping of the movement of the moving body 21, it is possible to prevent the stick on the stick transverse transfer members 11 and 12 from deviating widely or the sausage or the like suspended from the stick from swaying widely. Hence, errors are unlikely to occur in the delivery of the stick from the stick transverse transfer members 11 and 12 to the vertically transferring means 30 and in the placement of the stick from the vertically transferring means 30 onto the conveyor means 50.

What is claimed is:

1. An apparatus for transferring a stick with a strand of sausage or the like suspended therefrom, comprising:

transversely transferring means having a front-back pair, in a transfer direction of the stick, of stick transverse transfer members which are reciprocatingly movable between a first position and a second position which is located forwardly of the first position and is on a side of a transferring direction of the stick with the strand of sausage or the like suspended therefrom, said transversely transferring means being adapted to transfer the stick in a longitudinal direction of the stick from the first position to the second position by said stick transverse transfer members respectively supporting both end portions of the stick placed on said stick transverse transfer members at the first position; and vertically transferring means having a stick vertical transfer member which receives the stick released from the support by said stick transverse transfer members and disengaged from said stick transverse transfer members at the second position, undergoes lowering movement, and delivers the stick to conveyor means which travels in a direction intersecting the transfer direction of the stick, wherein said transversely transferring means includes a stick transfer body having said front-back pair of stick transverse transfer members respectively provided at both end portions thereof, a rail body which supports said stick transfer body and guides linear movement thereof between the first position and the second position, and a transverse wrapping connector traveling body wound around and trained between transverse transfer wheels respectively provided in vicinities of both end sides of said rail body, said stick transfer body being secured to a part of said transverse wrapping connector traveling body and adapted to be reciprocatingly moved by the forward and reverse rotation of said transverse transfer wheel which is driven by a transverse transfer electric motor.

2. The apparatus for transferring a stick with a strand of sausage or the like suspended therefrom according to claim 1, wherein said transverse wrapping connector traveling body of said transversely transferring means is a timing belt, and said transverse transfer wheel is a timing pulley.

3. The apparatus for transferring a stick with a strand of sausage or the like suspended therefrom according to claim 1, wherein said stick transfer body of said transversely transferring means has a movable frame extending in parallel to said rail body and a moving body which is provided laterally of said movable frame, is mounted on said movable frame with a shorter length than said movable frame, and extends in parallel to said rail body, said front-back pair of stick transverse transfer members being respectively attached to both end portions of said movable frame, both end portions of said transverse wrapping connector traveling body being attached to said moving body so as to form an endless shape, a guided portion provided on said moving body being linearly guided by said rail body, said moving body being reciprocatingly moved between the first position and the second position by the reciprocal traveling of said transverse wrapping connector traveling body.

4. An apparatus for transferring a stick with a strand of sausage or the like suspended therefrom, comprising:
   transversely transferring means having a front-back pair, in a transfer direction of the stick, of stick transverse transfer members which are reciprocatingly movable between a first position and a second position which is located forwardly of the first position and is on a side of a transferring direction of the stick with the strand of sausage or the like suspended therefrom, said transversely transferring means being adapted to transfer the stick in a longitudinal direction of the stick from the first position to the second position by said stick transverse transfer members respectively supporting both end portions of the stick placed on said stick transverse transfer members at the first position; and
   vertically transferring means having a stick vertical transfer member which receives the stick released from the support by said stick transverse transfer members and disengaged from said stick transverse transfer members at the second position, undergoes lowering movement, and delivers the stick to conveyor means which travels in a direction intersecting the transfer direction of the stick,
   wherein said vertically transferring means includes a vertical wrapping connector traveling body which is wound around and trained between vertical transfer wheels rotatively driven by a vertical transfer electric motor to form a lowering zone for downwardly moving the stick, and to which said stick vertical transfer member is attached, and stick sliding means which, when said stick vertical member is at a standstill at an upper position in the lowering zone, guides toward said stick vertical transfer member the sliding of the stick disengaged from said stick transverse transfer members, said stick vertical transfer member being adapted to receive the stick from said stick sliding means.

5. The apparatus for transferring a stick with a strand of sausage or the like suspended therefrom according to claim 4, wherein said transversely transferring means includes a stick transfer body having said front-back pair of stick transverse transfer members respectively provided at both end portions thereof, a rail body which supports said stick transfer body and guides linear movement thereof between the first position and the second position, and a transverse wrapping connector traveling body wound around and trained between transverse transfer wheels respectively provided in vicinities of both end sides of said rail body,
   said stick transfer body being secured to a part of said transverse wrapping connector traveling body and adapted to be reciprocatingly moved by the forward and reverse rotation of said transverse transfer wheel which is driven by a transverse transfer electric motor.

6. The apparatus for transferring a stick with a strand of sausage or the like suspended therefrom according to claim 4, wherein said vertical transfer wheels of said vertical transfer means include an upper wheel and a lower wheel provided immediately vertically below said upper wheel, said vertical wrapping connector traveling body forms the lowering zone ranging from said upper wheel to said lower wheel, and, while rotatively moving together with said lower wheel at a lower position in the lowering zone, said stick vertical transfer member attached to said vertical wrapping connector traveling body is adapted to deliver to said conveyor means the stick which said stick vertical transfer member received at the upper position.

7. The apparatus for transferring a stick with a strand of sausage or the like suspended therefrom according to claim 4, wherein a plurality of stick vertical transfer members are attached to said vertical wrapping connector traveling body at equal intervals in a traveling direction, and said vertical wrapping connector traveling body is arranged such that when a first one of said plurality of stick vertical transfer members is at a standstill at the upper position in the lowering area, a second one of said plurality of stick vertical transfer members is at a standstill in a rising zone after completing the delivery of the stick to said conveyor means.

8. The apparatus for transferring a stick with a strand of sausage or the like suspended therefrom according to claim 6, wherein said vertical wrapping connector traveling body of said vertically transferring means is a chain, said upper wheel and said lower wheel are sprockets, and said stick vertical transfer member is a hook member which is attached to said chain, is oriented upward in the lowering zone, and is oriented downward at a position of said lower wheel.

* * * * *